US011411603B2

(12) United States Patent
Strobel et al.

(10) Patent No.: US 11,411,603 B2
(45) Date of Patent: Aug. 9, 2022

(54) DEVICE FOR TRANSMITTING AND RECEIVING ON A COPPER WIRE INSTALLED AT A CUSTOMER PREMISE

(71) Applicant: Intel Corporation, Santa Clara, CA (US)

(72) Inventors: Rainer Strobel, Munich (DE); Vladimir Oksman, Morganville, NJ (US)

(*) Notice: Subject to any disclaimer, the term of this patent is extended or adjusted under 35 U.S.C. 154(b) by 0 days.

(21) Appl. No.: 16/638,487

(22) PCT Filed: Feb. 8, 2018

(86) PCT No.: PCT/US2018/017334
§ 371 (c)(1),
(2) Date: Feb. 12, 2020

(87) PCT Pub. No.: WO2019/055062
PCT Pub. Date: Mar. 21, 2019

(65) Prior Publication Data
US 2020/0266853 A1    Aug. 20, 2020

Related U.S. Application Data

(60) Provisional application No. 62/558,873, filed on Sep. 15, 2017.

(51) Int. Cl.
*H04L 12/66* (2006.01)
*H04B 3/23* (2006.01)
(Continued)

(52) U.S. Cl.
CPC .............. *H04B 3/23* (2013.01); *H04B 1/38* (2013.01); *H04L 5/14* (2013.01); *H04L 25/03878* (2013.01); *H04L 5/0007* (2013.01)

(58) Field of Classification Search
CPC . H04B 1/38; H04B 3/03; H04B 3/143; H04B 3/23; H04B 3/32; H04L 5/0007;
(Continued)

(56) References Cited

U.S. PATENT DOCUMENTS 8,537,912 B2 * 9/2013 Long .................. H04L 25/14
375/260
8,755,406 B2   6/2014 Skeba et al.
(Continued)

OTHER PUBLICATIONS

Zafaruddin et al., Signal Processing for Gigabit-Rate Wireline Communications, arXiv, 20 pages, Jun. 2017.*
(Continued)

*Primary Examiner* — Frank Duong
(74) *Attorney, Agent, or Firm* — Buchalter; Jason W. Croft

(57) ABSTRACT

A device for transmitting and receiving on a coaxial cable or twisted pair cable is disclosed. The device includes a plurality of transceivers for transmitting signals to, and receiving signals from, at least one customer premise equipment (CPE) via a plurality of channels. The plurality of channels may be formed by using a plurality of twisted pairs cable or by using a plurality of frequency bands on a coaxial cable or a twisted pair. The device may also include at least one canceller for cancelling echo and/or crosstalk on at least one channel, and a processor configured to allocate to a single CPE multiple frequency bands on a single cable or multiple lines among a bundle of twisted pairs. The device may work for both coaxial cables and twisted pair cables and support for unified use of channel bonding in a frequency domain and a spacial domain.

22 Claims, 18 Drawing Sheets

(51) Int. Cl.
  *H04B 1/38* (2015.01)
  *H04L 5/14* (2006.01)
  *H04L 25/03* (2006.01)
  *H04L 5/00* (2006.01)

(58) Field of Classification Search
  CPC ....... H04L 5/0044; H04L 5/14; H04L 5/1469; H04L 12/2863; H04L 25/02; H04L 25/03878; H04L 25/08; H04L 2012/6478; H04L 2012/6491; H04M 3/007
  See application file for complete search history.

(56) References Cited

U.S. PATENT DOCUMENTS

| | | | | |
|---|---|---|---|---|
| 8,761,294 | B2* | 6/2014 | Nuzman | H04B 3/32 375/267 |
| 9,270,333 | B2* | 2/2016 | Lu | H04B 3/32 |
| 9,362,959 | B2* | 6/2016 | Kuipers | H04B 3/32 |
| 9,473,240 | B2* | 10/2016 | Gupta | H04B 10/27 |
| 9,490,934 | B2* | 11/2016 | Goodson | H04L 1/0002 |
| 9,553,818 | B2* | 1/2017 | Goodson | H04L 45/125 |
| 9,628,752 | B2 | 4/2017 | Urban | |
| 9,954,631 | B2* | 4/2018 | Kerpez | H04L 5/14 |
| 10,069,532 | B2* | 9/2018 | Strobel | H04L 1/0001 |
| 10,122,641 | B1* | 11/2018 | Kuipers | H04L 12/2863 |
| 2010/0098000 | A1 | 4/2010 | Gerszberg et al. | |
| 2014/0362677 | A1 | 12/2014 | Kanellakopoulos et al. | |
| 2015/0263809 | A1 | 9/2015 | Gupta | |
| 2015/0349938 | A1* | 12/2015 | Trojer | H04L 5/0064 370/281 |

OTHER PUBLICATIONS

Oksman et al., The ITU-T's New G.fast Standard Brings DSL into the Gigabit Era, IEEE, 9 pages, Mar. 2016.*
Oksman et al., The ITU-T's New G.vector Standard Proliferates 100 Mb/s DSL, IEEE, 9 pages, Oct. 2010.*
Oksman et al., MGFAST: A New Generation of Copper Broadband Access, IEEE, 8, Aug. 2019.*
Coomans et al., XG-FAST: Towards 10 Gb/s Copper Access, IEEE, 6 pages, 2014.*
Strobel, Copper Transmission for Multi-Gigabit Hybrid Copper-Fiber Access Networks, IEEE, 6 pages, Nov. 8, 2017.*

* cited by examiner (a) Analog front-end using mirror frequencies for pass-band transmission (b) Analog front-end using a mixer for pass-band transmission (c) Analog front-end using mixers for base-band and passband transmission (a) DMT modulation (b) OFDM modulation A: All transceivers are co-located; CPE uses aggregated frequency channel B: Transceivers are not co-located; each CPE includes one transceiver and uses a separate line

DEVICE FOR TRANSMITTING AND RECEIVING ON A COPPER WIRE INSTALLED AT A CUSTOMER PREMISE

CROSS REFERENCE TO RELATED APPLICATIONS

This application claims priority under 35 U.S.C. § 119(e) to U.S. provisional application No. 62/558,873, entitled "Channel Bonding for Multi-Gigabit Copper Transceivers" and filed Sep. 15, 2017, which is incorporated by reference as if fully set forth herein.

FIELD

Examples relate to a transceiver, a method, a system, and a software program for transmitting and receiving on a copper wire cable(s). More particularly, examples relate to a transceiver for transmitting and receiving on a coaxial cable(s) or a twisted pair cable(s) while implementing channel bonding and/or point-to-multipoint (P2MP) transmissions.

BACKGROUND

In order to provide communication services, networks have been deployed by service providers. For copper-based transmissions, two media types of interest are coaxial cables and twisted pair cables. A single coaxial cable may serve one subscriber or may be shared by multiple subscribers. On a twisted pair cable, there are usually multiple twisted pairs, (e.g., two or four), per subscriber. These twisted pair cables may be regular low-cost twisted pair cables for plain old telephone system (POTS) or 4-pair high-end shielded twisted pair cables used for in-home Ethernet routing (e.g. Cat 5, Cat 6, etc.). Multiple subscribers, (e.g. in a multi-dwelling units), are often served from a bigger cable binder, and one or more twisted pairs of the binder are used to connect each subscriber.

The demand for higher data rates has ever been increasing. To achieve higher data rates in an access network, an optical fiber has been brought closer to the subscriber. For in-house wiring, it is in many cases easier and cheaper to rely on existing copper wires, which may be either coaxial cables or twisted pair cables for POTS installation or an in-home Ethernet installation.

One way to achieve higher data rates is expanding the frequency band. However, a wider frequency band results in higher line attenuation. Twisted pair cables show a very high attenuation at higher frequencies, which limits the usable frequency band and thus the achievable throughput.

For coaxial cables, this is not a big issue due to their relatively low attenuation even at high frequencies. However, with low attenuation, the duration of impulse response in coaxial cables is mainly determined by reflections from multiple bridged taps. As a result, use of multicarrier modulation, such as orthogonal frequency division multiplexing (OFDM) or discrete multi-tone (DMT), requires keeping a substantial guard interval also for wider frequency band. To keep the transmission efficient, the symbol duration need to be sufficiently long. Thus, increase of the frequency band can be done by increasing the number of subcarriers. However, increasing the number of subcarriers substantially increases the complexity of implementation and management of the system. The number of subcarriers has already been increased to 4,096 in G.fast, 212 MHz bandwidth. Further increase to 8,192 subcarriers for a 424 MHz system or 16,384 subcarriers for targeted bandwidth of 848 MHz would be overly complex.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
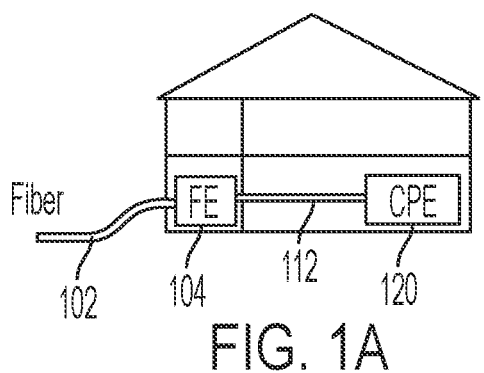
FIGS. 1(a)-1(d) show some examples of a home network in which the examples disclosed herein may be implemented.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for a network device architecture and network operation and signal modulation schemes that can work for both coaxial cables and twisted pair cables. In the examples disclosed herein, the same transceiver may be used for both coaxial cables and twisted pair cables.

Examples are also disclosed for unified use of channel bonding in a frequency domain and a spacial domain. This takes into account that a twisted pair cable in a customer premise usually includes multiple twisted pairs which may be combined for data transmission. The Cat 5/6/7 twisted pair cable all contains four twisted pairs in each twisted pair cable.

Figure 1B:
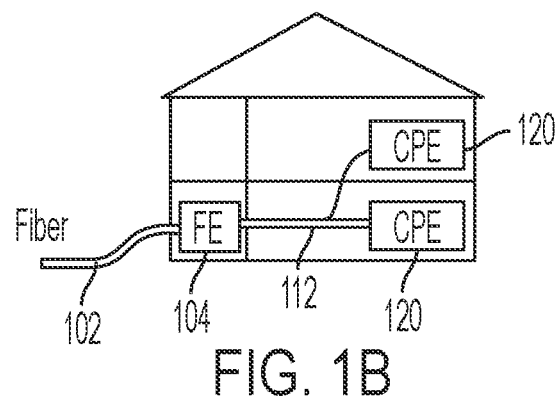
Figure 1C:
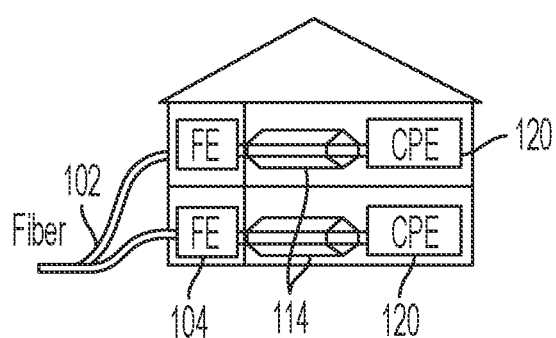
Figure 1D:
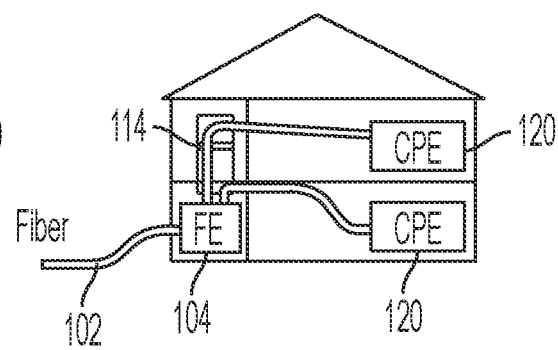

FIGS. 1(a)-1(d) show some examples of a home network in which the examples disclosed herein may be implemented. In order to increase data rates, an optical fiber 102 has been brought closer to the customer premises. There is still a gap between the fiber termination and a customer premise equipment (CPE). Typically, the gap is bridged by a copper wire(s), such as a coaxial cable 112 or a twisted pair cable(s) 114. FIGS. 1(a) and 1(b) show examples that a single coax cable 112 connects one or more CPEs 120 to the optical fiber 102. FIGS. 1(c) and 1(d) show examples that a twisted pair bundle 114 connects one or more CPEs 120 to the optical fiber 102. In FIG. 1(b), a P2MP may be implemented. In FIGS. 1(c) and 1(d) point-to-point multiple-input multiple-output (MIMO) or multi-user MIMO may be implemented, respectively. A fiber extender (FE) 104 at the end of the optical fiber 102 converts the optical signals to electrical signals to be transmitted on a copper wire(s), and vice versa. The FE 104 may be installed in or near the customer's premise. Alternatively, instead of the optical fiber, a coaxial cable or a hybrid fiber coaxial network may be deployed to the customer's premise. Examples of CPEs include, but are not limited to, a home router, a set-top box (STB), a home gateway, a personal computer, a laptop computer, a tablet, a smartphone, a telephone, an IP TV, an IP phone, or the like.

In case where a coaxial cable connects an FE with CPEs (as shown in FIGS. 1(a) and 1(b)), a wider spectrum (i.e. multiple frequency bands) may be used to increase a data rate. In case where a twisted pair cable is used to connect an FE and CPEs (as shown in FIGS. 1(c) and 1(d)), use of high frequency bands may be limited due to high attenuation of the twisted pair cables.

However, since twisted pairs are installed in a bundle, multiple twisted pairs in a twisted pair cable may be used to increase the data rate. Point-to-multipoint (P2MP) operation may be implemented if multiple CPEs are connected to the same coaxial cable or to the same twisted pair.

Figure 2:
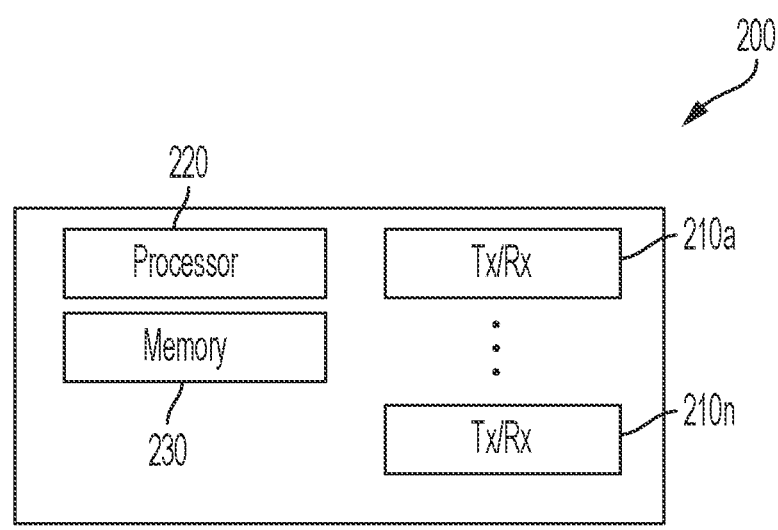
FIG. 2 shows an example of a network device.

FIG. 2 shows an example of a network device 200 for connecting an access network (e.g. an optical fiber, a coaxial cable, or a hybrid network) to a network in a customer premise (e.g. a coax cable or twisted pair cables). The network device 200 may be a distribution point unit (DPU) deployed at a distribution point near or in the customer's premises. The network device 200 may be the FE 104 shown in FIG. 1 connected at the end of the optical fiber 102. The network device 200 may operate both for baseband transmissions on multiple bonded twisted pairs or for baseband and passband transmissions on multiple bonded frequency channels on a single coax cable or on a twisted pair in a twisted pair cable. In some examples, the network device 200 may include a configurable echo/crosstalk canceller for echo and/or crosstalk cancellation.

The network device 200 includes a plurality of transceivers 210a-210n to transmit and receive on a plurality of transmission lines (e.g. twisted pairs in a twisted pair cable) or on a plurality of frequency bands on a single transmission line (e.g. a coax cable or a twisted pair). The network device 200 may also include a processor 220 and a memory 230 for performing various functionalities of the device 200 including, but not limited to, access control for CPEs, vectoring control entity (VCE), dynamic resource allocation for CPEs, or the like, which will be explained in detail below. The processor 220 controls the transceivers 210 for transmitting to and receiving from CPEs, and may send control signals to the CPEs for controlling transmissions and reception at the CPE side (e.g. by assigning a channel comprising either multiple frequency bands on a single cable or multiple twisted pairs in a twisted pair cable to CPEs, reallocating a channel from one CPE to another temporarily, or allocating a transmission mode of either TDD or FDD of FDX with or without echo cancellation, or the like).

In some examples, in order to achieve higher data rates, two or more transceivers 210a-210n may be used simultaneously for transmission to, or reception from, a single CPE, wherein each transceiver 210a-210n serves either a different frequency band on the same transmission line (which is referred to as "multi-band bonding") or a different transmission line (which is referred to as "multi-line bonding"). The term "bonding" means using two or more channels simultaneously for transmission or reception. Each of bonded channels may be established over a separate wire pair, or a separate coax line, or a separate frequency band inside wide-band medium, such as a coax cable.

Figure 3A:
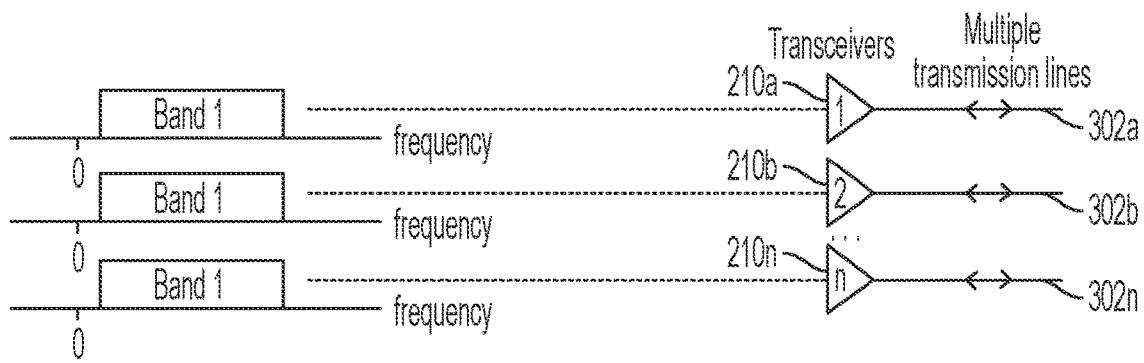
FIG. 3(a) shows an example of multi-line bonding.
Figure 3B:
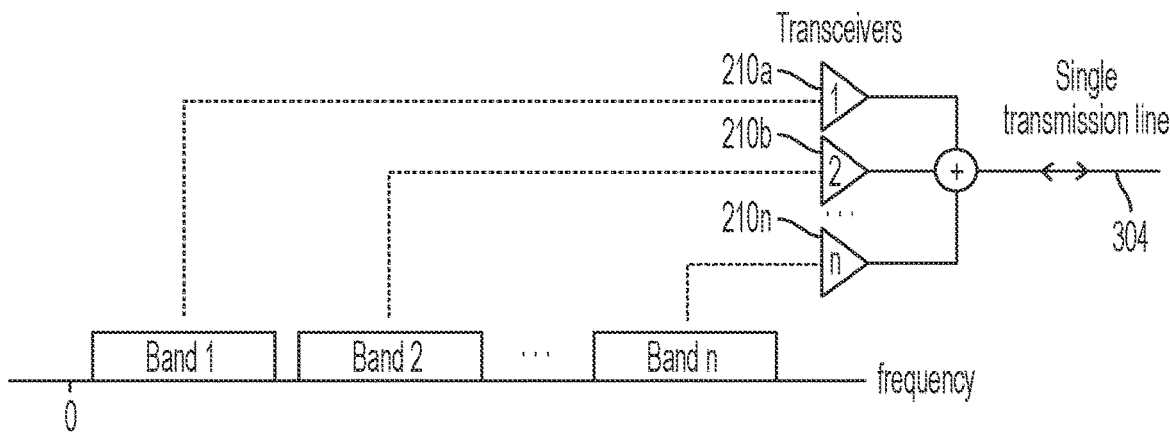
FIG. 3(b) shows an example of multi-band bonding.

An example of multi-line bonding is depicted in FIG. 3(a), and an example of multi-band bonding is depicted in FIG. 3(b). The network device 200 may use a plurality of transceivers 210a-210n to transmit on a plurality of transmission lines 302a-302n (e.g. multiple twisted pairs in a twisted pair cable) on the same frequency band (e.g. band 1) as shown in FIG. 3(a), or on a plurality of bands (band 1, band 2, . . . , band n) on a single transmission line 304 (e.g. a single coax cable or a single twisted pair) as shown in FIG. 3(b).

Figure 4:
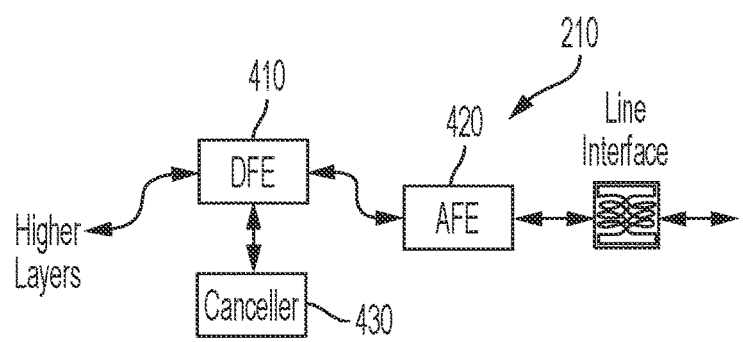
FIG. 4 shows an example transceiver that may be included in the network device.

FIG. 4 shows an example transceiver 210 that may be included in the network device 200. The transceiver 210 may include a digital front end (DFE) 410 and an analog front end (AFE) 420. The transceiver 210 may also include an echo/crosstalk canceller 430. The transceiver 210 may operate in a time division duplexing (TDD) mode or in a full duplex (FDX) mode. In a TDD mode, a transceiver 210 may either transmit to or receive from a respective CPE at a time. In an FDX mode, a transceiver 210 may transmit to and receive from a respective CPE simultaneously. The FDX mode may be implemented with echo cancellation (EC).

The transceiver 210 in FIG. 4 may provide a certain bit rate. The bit rate may be limited by the used frequency band. To duplicate or increase the data rate, multi-line bonding or multi-band bonding may be implemented. Depending on the required user data rate, multiple transceivers 210 may be arranged for channel bonding with multiple lines or multiple frequency bands, as shown in FIGS. 3(a) and 3(b). A transceiver 210 may operate with one canceller 430 for echo cancellation in an FDX mode, for example using a basic frequency band (e.g. 424 MHz band). Alternatively, multiple transceivers 210a-210n may operate with one canceller 430. The transceiver 210 may be set for operation in a TDD mode, and may use different frequency bands.

Figure 5:
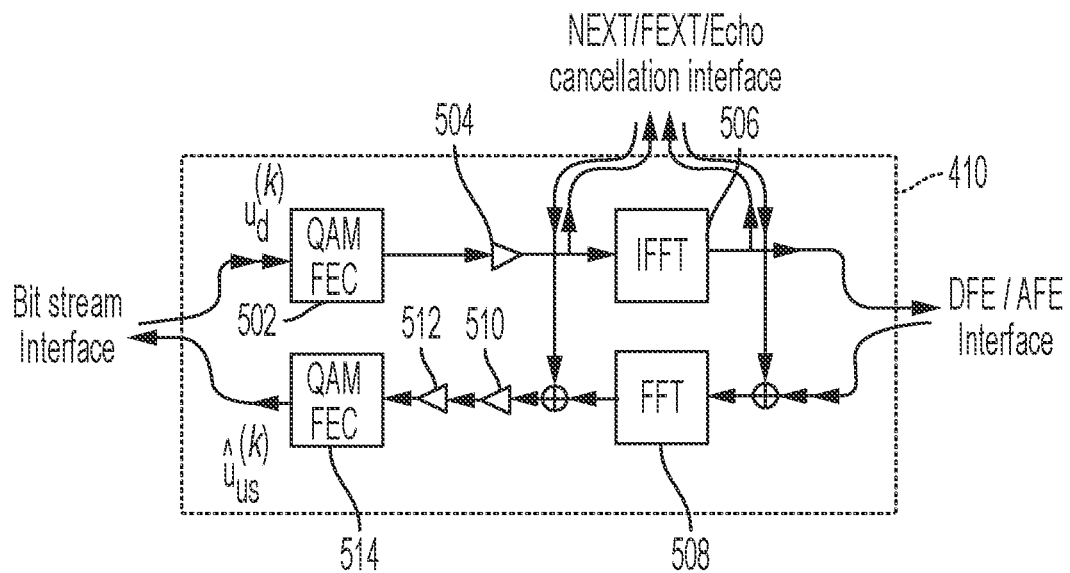
FIG. 5 shows an example structure of the digital front end (DFE)

FIG. 5 shows an example structure of the DFE 410. The DFE 410 interfaces with the AFE 420 on one side and with a higher layer data processing on the other side. For example, in a transmit direction, the DFE 410 may perform symbol modulation and channel coding 502 (e.g. quadrature amplitude modulation (QAM) and forward error correction (FEC) coding, interleaving, etc.), transmit power spectral density (PSD) shaping 504 with gain value $s_{ds}(k)$, inverse fast Fourier transform (IFFT) 506 for discrete multi-tone (DMT) or orthogonal frequency division multiplex (OFDM) modulation, and the like. In some examples, the FEC may implement a Reed-Solomon coding or low density parity check (LDPC) coding, or the like. Alternatively, the FEC may be a coded QAM modulation, such as Trellis coding or LDPC-CM (LCM) or a combination of an outer coding (e.g., Reed Solomon) and an inner coding (e.g., LDPC-LC).

In a receive direction, the DFE 410 may perform fast Fourier transform (FFT) 508 for DMT or OFDM demodulation, PSD shaping 510 with gain value $s_{us}(k)$, channel equalization ($g_{us}$) 512, symbol demodulation (QAM) and channel decoding 514 (FEC decoding, deinterleaving, etc.), and the like. In the receive chain, echo/crosstalk cancellation may be performed either in a frequency domain or in a time domain. The transmit and receive chains in the DFE 410 may operate one at a time to support the TDD operation or may operate in parallel to support the FDX operation.

Figure 6:
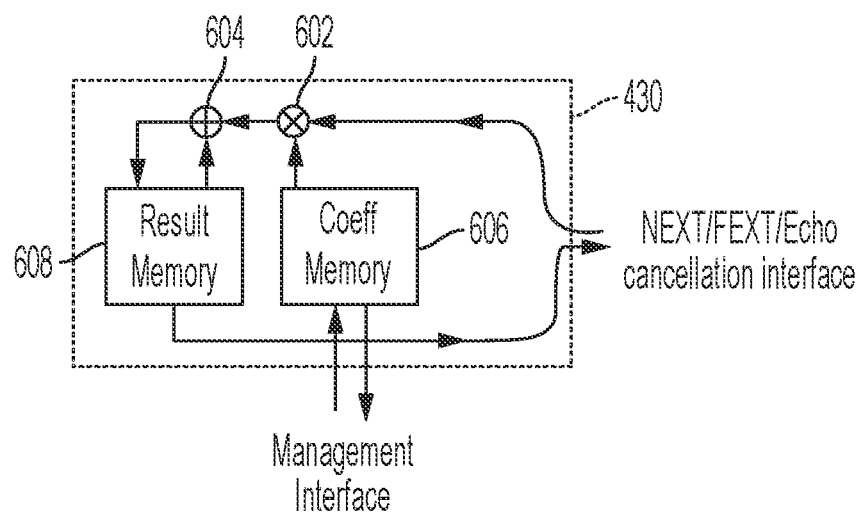
FIG. 6 shows an example structure of the canceller.

FIG. 6 shows an example structure of the canceller 430. The DFE 410 and the canceller 430 may include an interface for communication for crosstalk cancellation and/or echo cancellation. The crosstalk may be near-end crosstalk (NEXT) and/or far-end crosstalk (FEXT). For example, the canceller 430 may include one or more multipliers 602 and adders 604, a coefficient memory 606, and a result memory 608. The canceller 430 is connected to one or more transceivers 210a-210n to perform echo and/or crosstalk cancellation. Multiple canceller components may be combined for crosstalk cancellation between multiple lines. The canceler 430 may implement frequency domain echo/crosstalk cancellation or time domain echo/crosstalk cancellation, for example using finite impulse response (FIR) filters.

Figure 7:
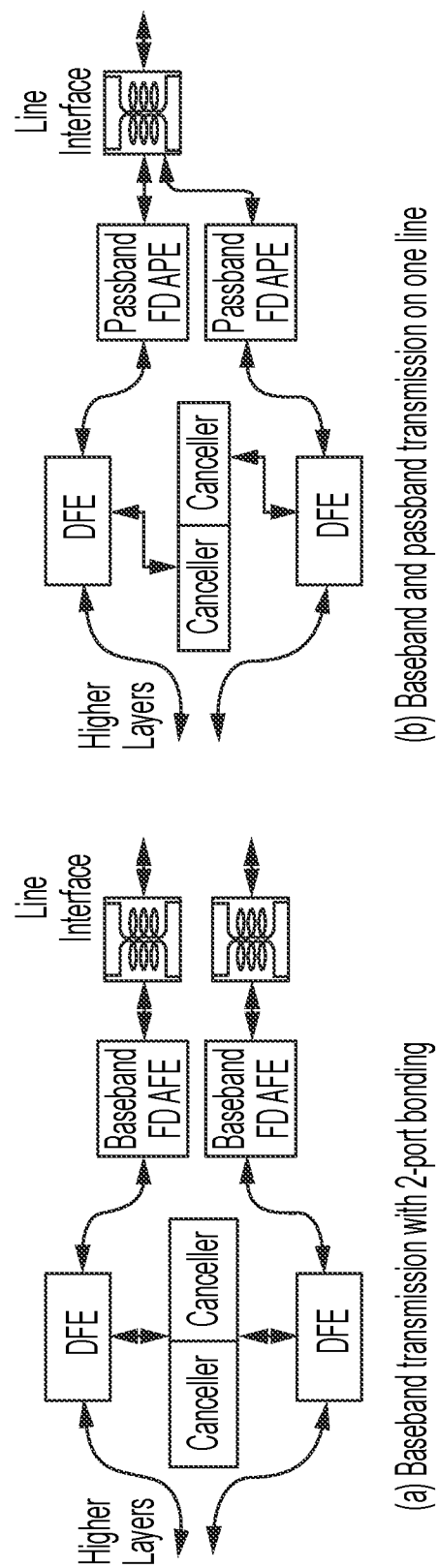
FIGS. 7(a) and 7(b) show an example of combining multiple transceivers for multi-line bonding and multi-band bonding, respectively.

FIGS. 7(a) and 7(b) show an example of combining multiple transceivers for multi-line bonding and multi-band bonding, respectively. For the coax cable, echo cancellation may be performed to implement an FDX mode. For the twisted pair bonding, NEXT and FEXT cancellation may also be performed. Crosstalk (NEXT and FEXT) cancellation requires additional processing, which increases with the number of lines. In the example shown in FIG. 7(b), interference between neighboring channels (bands) may be present. Digital filters may be used to reduce the interference from the neighboring channels (e.g. the adjacent frequency band). Additionally, or alternatively, the interference from the neighboring channels may be cancelled by the canceler 430.

It should be noted that FIGS. 7(a) and 7(b) show a network device with two transceivers for two-line bonding or two-band bonding as an example, and the network device may include any number of transceivers and the channel bonding may be extended to any number of lines or frequency bands. For example, for increasing the number of channels to four, the channel bonding may be implemented with four transceivers 210a-210n by using 4-port line bonding on four twisted pairs (e.g. on a frequency band of 424 MHz), 2-port line bonding with double data rate on each line (e.g. two frequency bands on each line), or a single line with frequency bonding using four bands (e.g. each band of 424 MHz).

In some examples, the number of transceivers 210a-210n in the network device 200 may be greater than the total number of transceivers at the CPE side. In case of multi-line bonding, transceivers 210a-210n at the network device 200 on lines that are not connected to any CPE ("free lines") may be used to improve performance in the lines connected to CPEs ("connected lines") through a crosstalk channel. For example, the network device 200 may transmit over the free lines a signal that is the same as in one of the connected lines on all tones (in case of multi-carrier transmission such as DMT or OFDM) to enhance performance of a particular line. Alternatively, the network device 200 may transmit over the free lines a signal that is the same as in more than one line in different sets of tones to enhance weak parts of the spectrum on individual lines.

The AFE 420 converts the baseband signals output from the DFE 410 to analog signals for transmission via the line interface 440 and converts the analog signals received via the line interface 440 to digital signals for processing by the DFE 410. For multi-line bonding, the baseband signals may be transmitted on each line (e.g. a twisted pair) without frequency shifting. For multi-band bonding, some or all of the baseband signals may be shifted to a higher frequency. Use of additional frequency bands (e.g., a band 424-848 MHz) requires shifting of the baseband signals output from the DFE 410 to a higher frequency band (called hereinafter "passband"). The frequency shifting may be performed by separate AFE components or by a single AFE which includes components for performing filtering and mixing of passband and baseband signals in an analog or digital domain.

Figure 8:
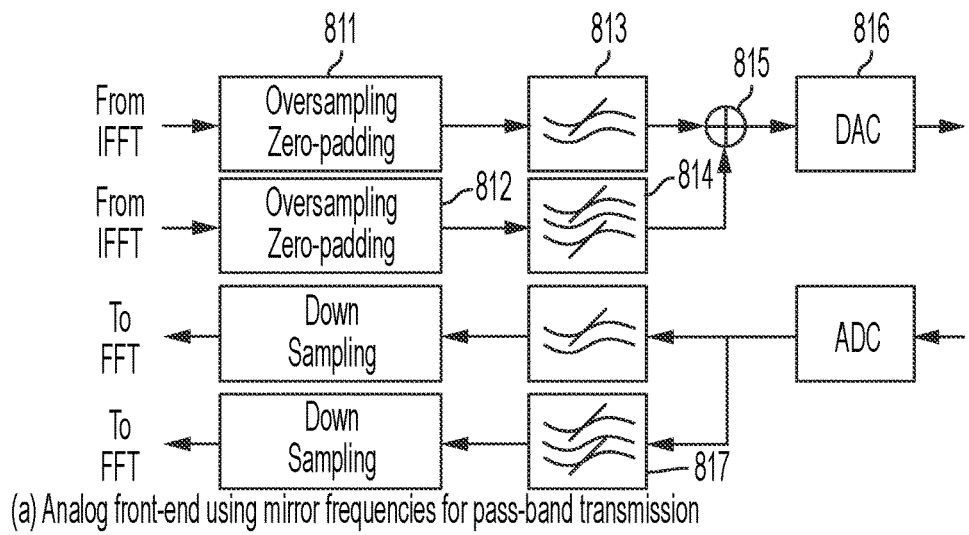
FIGS. 8(a)-8(c) shows several examples of the analog front end (AFE) for baseband and passband transmissions.
Figure 8:
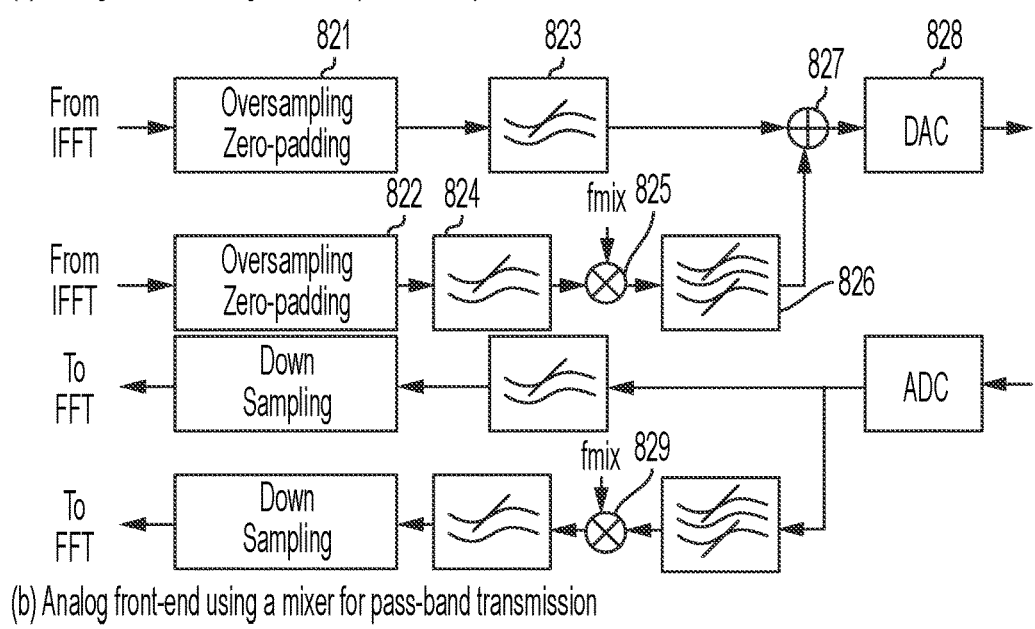
Figure 8:
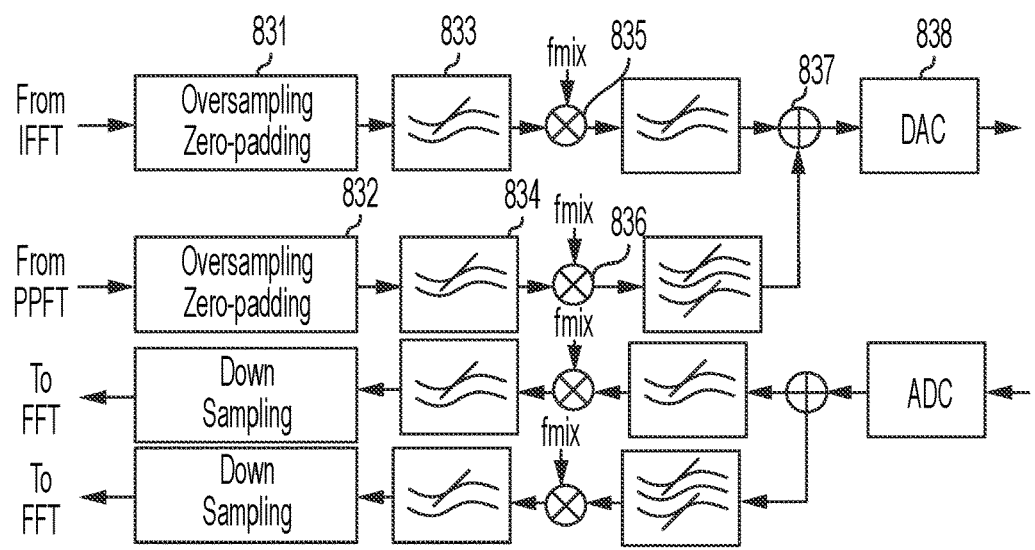

FIGS. 8(*a*)-8(*c*) shows several examples of the AFE 420 for baseband and passband transmissions. In FIG. 8(*a*), the AFE 420 uses mirror frequencies for the passband transmission. The baseband and passband signals are oversampled (e.g. by zero padding) 811, 812 and filtered by a baseband filter 813 and a passband filter 814, respectively, in a digital domain. In case that the passband start frequency is a multiple of the baseband frequency, the mirror band, which appears after the up-sampling, can be filtered by the bandpass filter 814 and added to the baseband signal. No separate mixer may be used. The baseband and passband signals are combined by an adder 815 and converted to an analog signal by a digital-to-analog converter (DAC) 816 for transmission. For reception, a passband filter 817 may be applied to the received signals and after down-sampling, the baseband signal will be reconstructed.

In FIG. 8(*b*), the AFE 420 uses a mixer for the passband transmission. The baseband signals on two transmit chains are oversampled (e.g. by zero padding) 821, 822 and filtered by baseband filters 823, 824, respectively, in a digital domain. The passband signal is mixed by a mixer 825 and then filtered by a passband filter 826. The passband signal can be placed at an arbitrary frequency. In a digital domain, the mixer 825 is implemented by multiplying the baseband signal with a sine wave of the desired center frequency. The baseband and passband signals are then combined by an adder 827 and converted to an analog signal by a DAC 828 for transmission. For reception, a mixer 829 may be used to recover the baseband signal.

In FIG. 8(*c*), the AFE 420 uses a mixer for both baseband and passband branches. The baseband and passband signals are oversampled (e.g. by zero padding) 831, 832 and filtered by a baseband filter 833, 834, respectively, in a digital domain. The signals in both channels are mixed by a separate mixer 835, 836 and then filtered to different frequencies. One channel is located at a lower frequency and another channel is located at a higher frequency. This allows to use OFDM modulation for generation of both the baseband and passband signals. The signals are then combined by an adder 837 and converted to an analog signal by a DAC 838 for transmission. For reception, separate baseband and passband filters are used to recover the signals.

Figure 9:
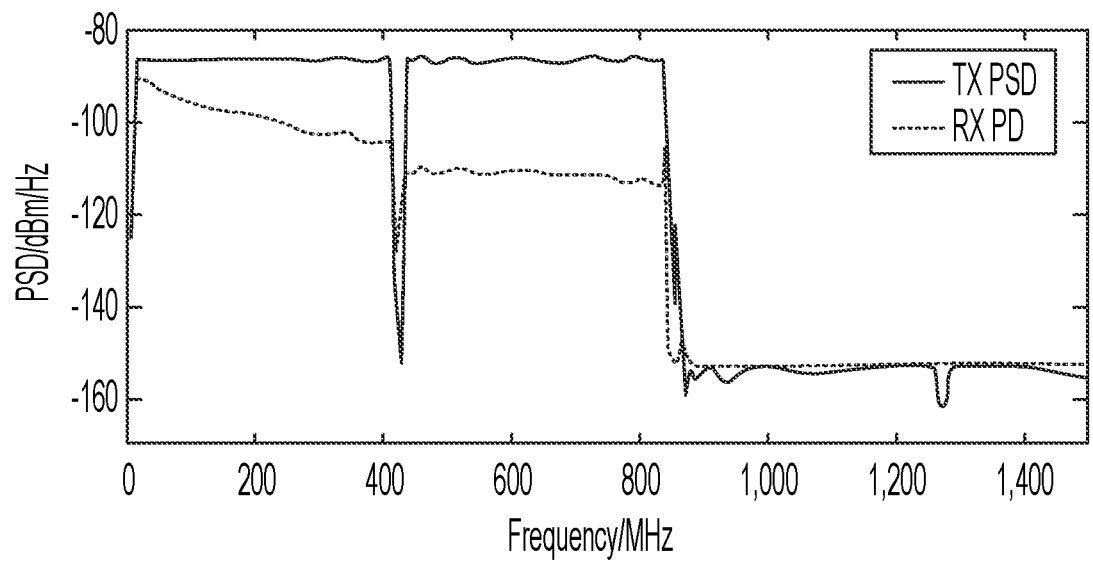
FIG. 9 shows transmit and receive power spectral density (PSD) observed on the line when using mirror frequencies to generate the passband signal.
Figure 10:
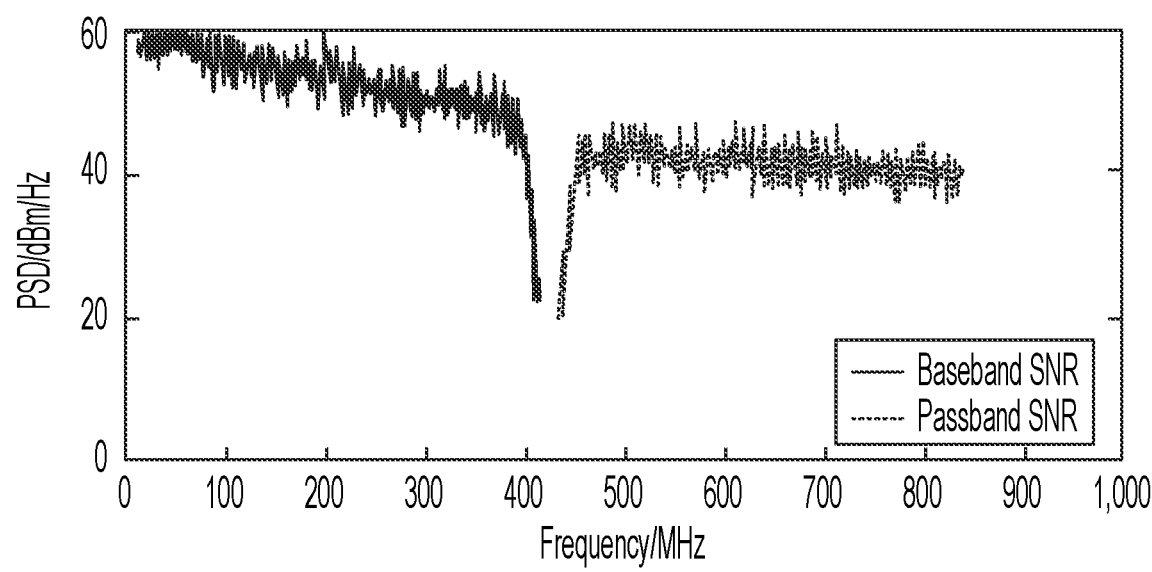
FIG. 10 shows a signal-to-noise ratio (SNR) observed for the baseband signal and the passband signal when using mirror frequencies.

FIG. 9 shows transmit and receive PSD observed on the line when using mirror frequencies to generate the passband signal. FIG. 10 shows a signal-to-noise ratio (SNR) observed for the baseband signal and the passband signal when using mirror frequencies. When using mirror frequencies for transmission, the PSD of the transmit signal on the line according to FIG. 9 is observed. There is a small gap between the bands, which is created because the subcarriers on the band edge are not used for data transmission. This is necessary, because the filter which is used to separate the baseband and the passband signals have a limited slope and the carriers on the band edge experience high attenuation and interference. This is visible in the SNR, as shown in FIG. 10. On the band edge between baseband and passband the SNR degrades for both signals. Interference between the frequency bands can also be reduced by cancelling it with the cancellation units.

Figure 11:
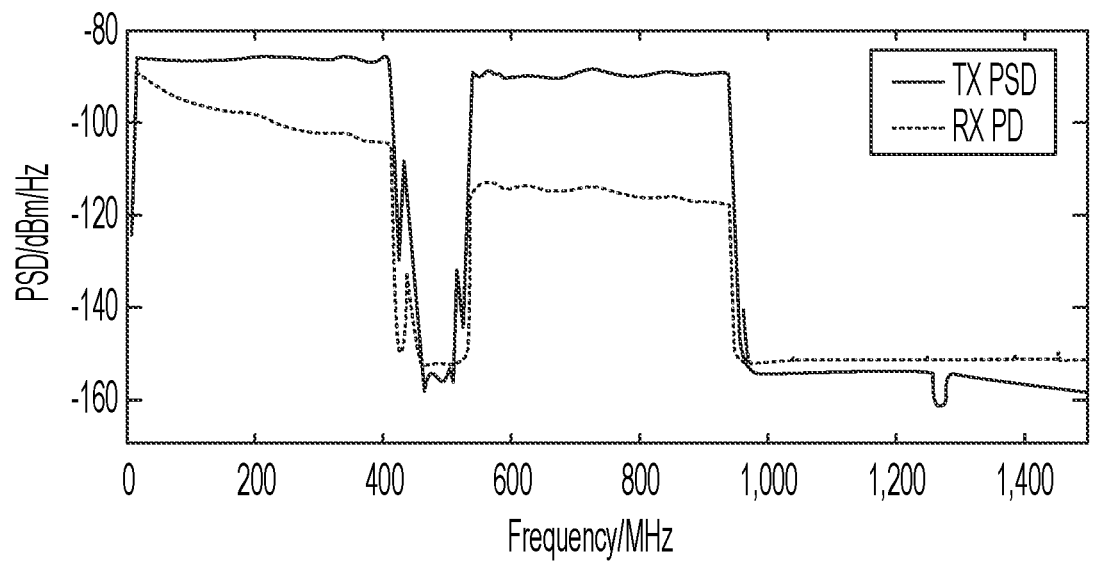
FIG. 11 shows transmit and receive PSD observed on the line when using a mixer to generate the passband signal.
Figure 12:
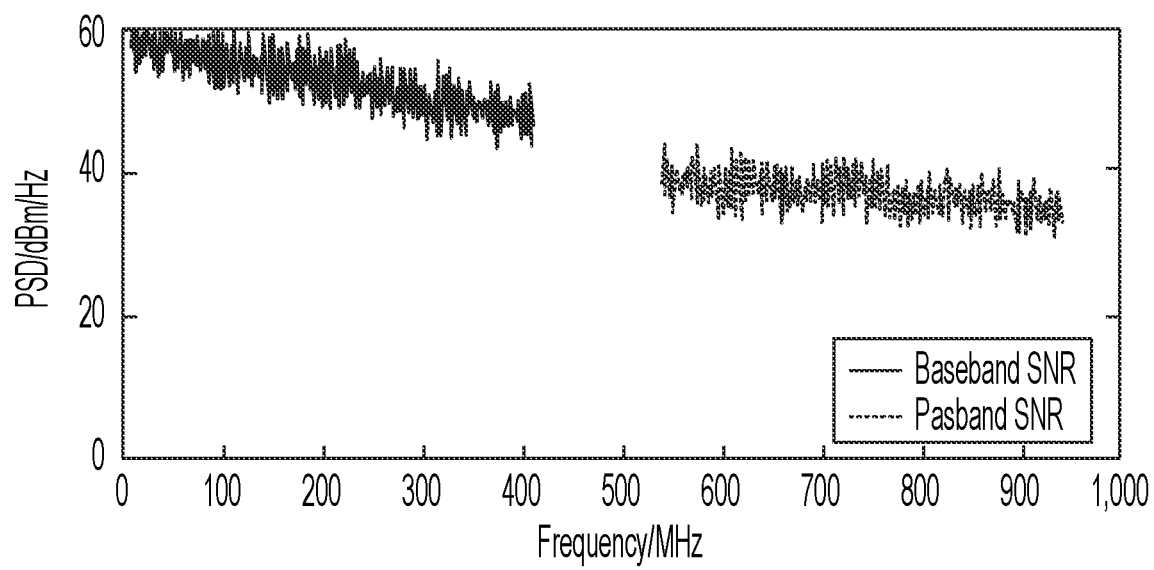
FIG. 12 shows the SNR observed for the baseband signal and the passband signal when using a mixer.

FIG. 11 shows transmit and receive PSD observed on the line when using a mixer to generate the passband signal. FIG. 12 shows the SNR observed for the baseband signal and the passband signal when using a mixer. When using the mixer, the PSD as shown in FIG. 11 is observed on the line. In the example, two bands with 424 MHz and a gap of 106 MHz between the bands is configured. With the larger gap, interference between the baseband and the passband transmission is very small and there is no SNR degradation at the band edges, as shown in FIG. 12. In case when a smaller guard band is set, the interference can be higher and have to be reduced by more powerful filtering or by using crosstalk canceller.

Figure 13:
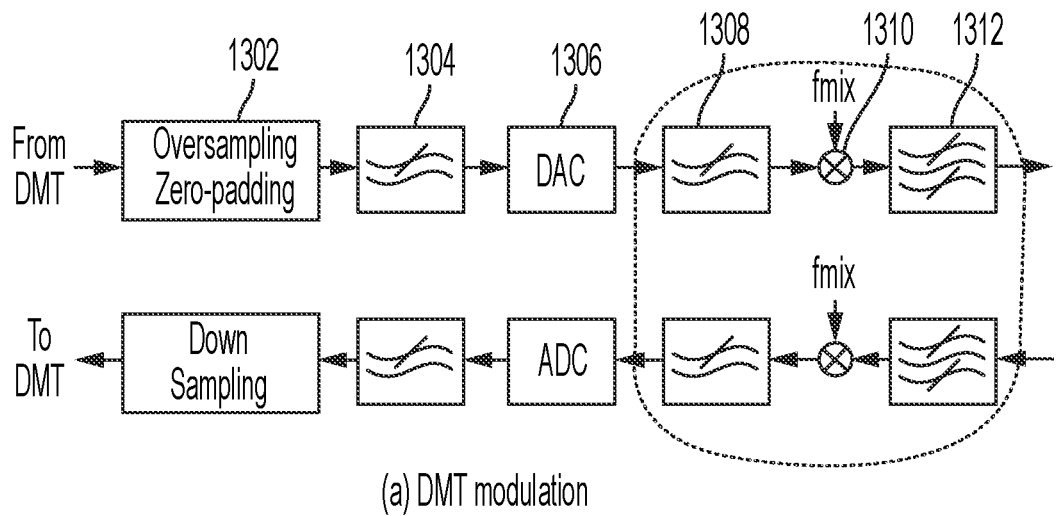
FIGS. 13(a) and 13(b) show example processing of the passband signals in an analog domain with DMT or OFDM modulation, respectively.
Figure 13:
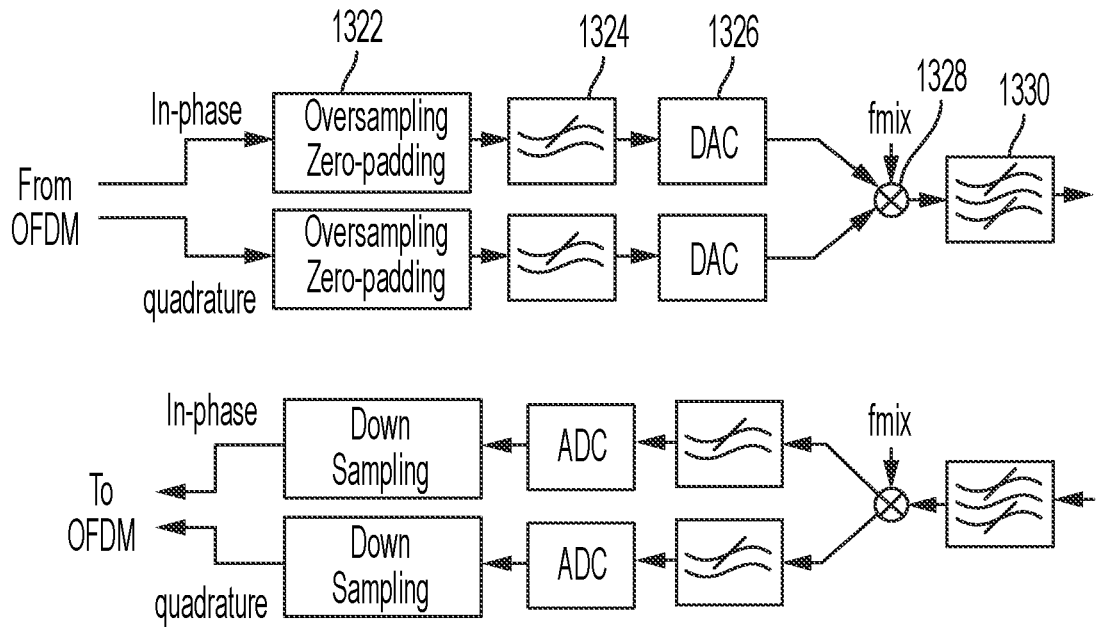

The examples of FIGS. 8(*a*)-8(*c*) show the mixer and filter implementation in a digital domain. Alternatively, the mixing and filtering may be done in an analog domain with an external component(s) on analog signals. FIGS. 13(*a*) and 13(*b*) show example processing of the passband signals in an analog domain with DMT or OFDM modulation, respectively.

There are different types of multicarrier modulation. DMT is used in xDSL and G.fast, and OFDM is used for wireless applications and on coax cables. In FIG. 13(*a*), DMT modulation creates a real-valued output signal from the complex frequency domain signal. K complex DMT subcarriers are translated into 2K real-valued time domain samples. After that, the cyclic extension is added and windowing is applied. After up-sampling 1302 and filtering 1304, the signal is converted to analog signals by a DAC 1306. For baseband transmission, no additional filtering and mixing is required in DMT, but for passband transmission, filtering 1308, 1312 and mixing 1310 may be performed.

In FIG. 13(*b*), K complex OFDM carriers are translated into K complex time domain samples. In-phase and quadrature components are up-sampled 1322, filtered 1324 and converted to analog signals by a DAC 1326, and then mixed with a mixer 1328 having two inputs (in-phase and quadrature component) and filtered with a bandpass filter 1330. The mixer required for OFDM may be implemented digitally before DAC.

The multi-line bonding and the multi-band bonding in accordance with the examples disclosed herein may be applied to both OFDM and DMT modulations, or any other modulation.

The network device 200 sends user data packets to the CPEs in downstream and receives user data packets from the CPEs in upstream. The user data packets (both upstream and downstream) are mapped to data transmission units (DTUs) that carry one or more of user packets. DTUs are primary data units sent over each channel (over a particular transmission line (e.g. a twisted pair in a twisted pair cable) in case of multi-line bonding, or over a particular frequency band in case of multi-band bonding). With multi-channel bonding (i.e. multi-line bonding or multi-band bonding), user data packets of one logical link (e.g., one service slice or one priority queue) may be transmitted over different physical links (e.g. different frequency bands or different transmission lines). Different physical links may support different data rates and latencies, and may provide different quality of service (QoS) and may be associated with different service slices. In some examples, in order to support variety of services and accommodate different capacity of physical links, the network device 200 may configure different DTU sizes and different rules for DTU transmission and retransmission for different physical links (including no retransmissions of DTUs).

Figure 14A:
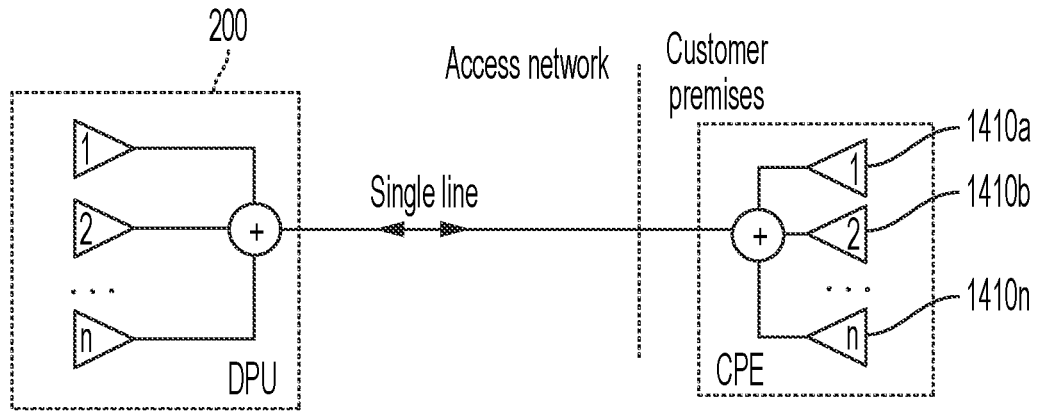
FIG. 14(a) shows co-located transceivers at a customer premise equipment (CPE) and FIG. 14(b) shows transceivers that are not co-located at a CPE.
Figure 14B:
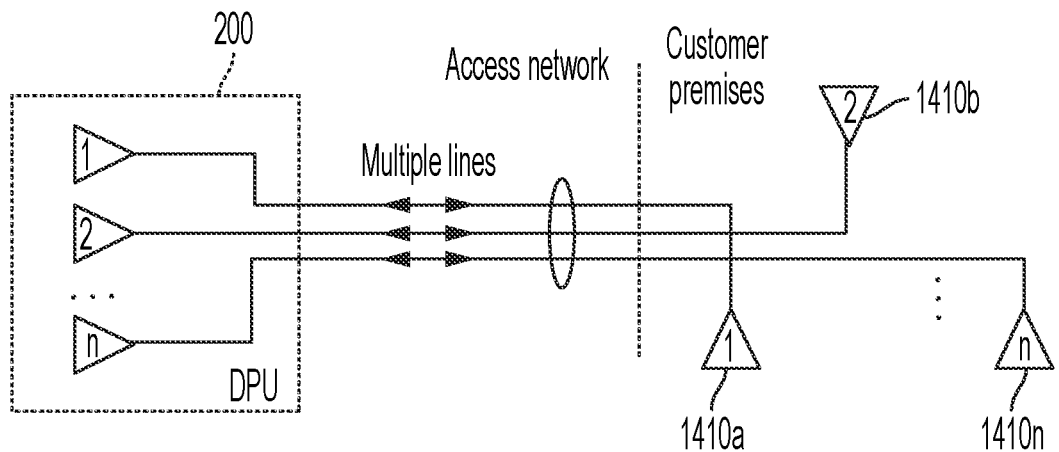

The transceivers at a CPE side serving particular lines or particular frequency bands may be co-located or not. FIG. 14(a) shows co-located transceivers at a CPE and FIG. 14(b) shows transceivers that are not co-located at a CPE. In case transceivers 1410a-1410n are co-located in a CPE, the transceivers 1410a-1410n may use similar schemes that are used at the network device side, which is shown in FIG. 3 for channel bonding (i.e. multi-line bonding or multi-band bonding), for the upstream transmissions. In case transceivers 1410a-1410n are not co-located at the CPE, the transceivers 1410a-1410n of the CPEs provide a multi-terminal (multi-CPE) connection, which allows distribution of corresponding service slices to desired customer locations. The multi-line bonding and the multi-band bonding are applicable to both cases. In both cases, all transceivers 1410a-1410n may be configured, controlled, and managed by the network device 200, e.g. a distribution point unit (DPU).

Multiple CPEs may be connected to the network device 200, for example, via twisted pairs in a twisted pair cable. The CPEs may have different capabilities and support a different mode of operations. Some CPEs may be able to operate in an FDX mode, and some CPEs may be able to operate only in a TDD mode (e.g., a CPE supporting G.fast standards).

In case CPEs having different capabilities and different operation modes are connected to the network device 200, the network device 200 may implement a coexistence scheme for all CPEs. In the examples hereinafter, the terms "legacy CPE" and "legacy system" will be used to refer to a CPE and a system that can operate only in a TDD mode and on a baseband, and the terms "new CPE" and "new system" will be used to refer to a CPE and a system that can operate in an FDX mode (including a TDD mode) and both on a baseband and a higher frequency band (i.e. a passband). It is assumed that the legacy CPEs and new CPEs both use multi-carrier modulation such as DMT. The legacy system may be the conventional G.fast system and the new system may be a system extended from the conventional G.fast system (e.g. G.mgfast).

For coexistence of the legacy CPEs and new CPEs connected to the same network device 200, the same tone spacing and duration of the multi-carrier modulation symbol (e.g. by setting an appropriate cyclic extension of the DMT symbol) may be used by the network device 200. With this scheme, both the legacy system and the new system may be deployed from the same network device 200, and crosstalk incurred on the twisted pairs in a twisted pair cable between the legacy system and the new system may be canceled.

Figure 15:
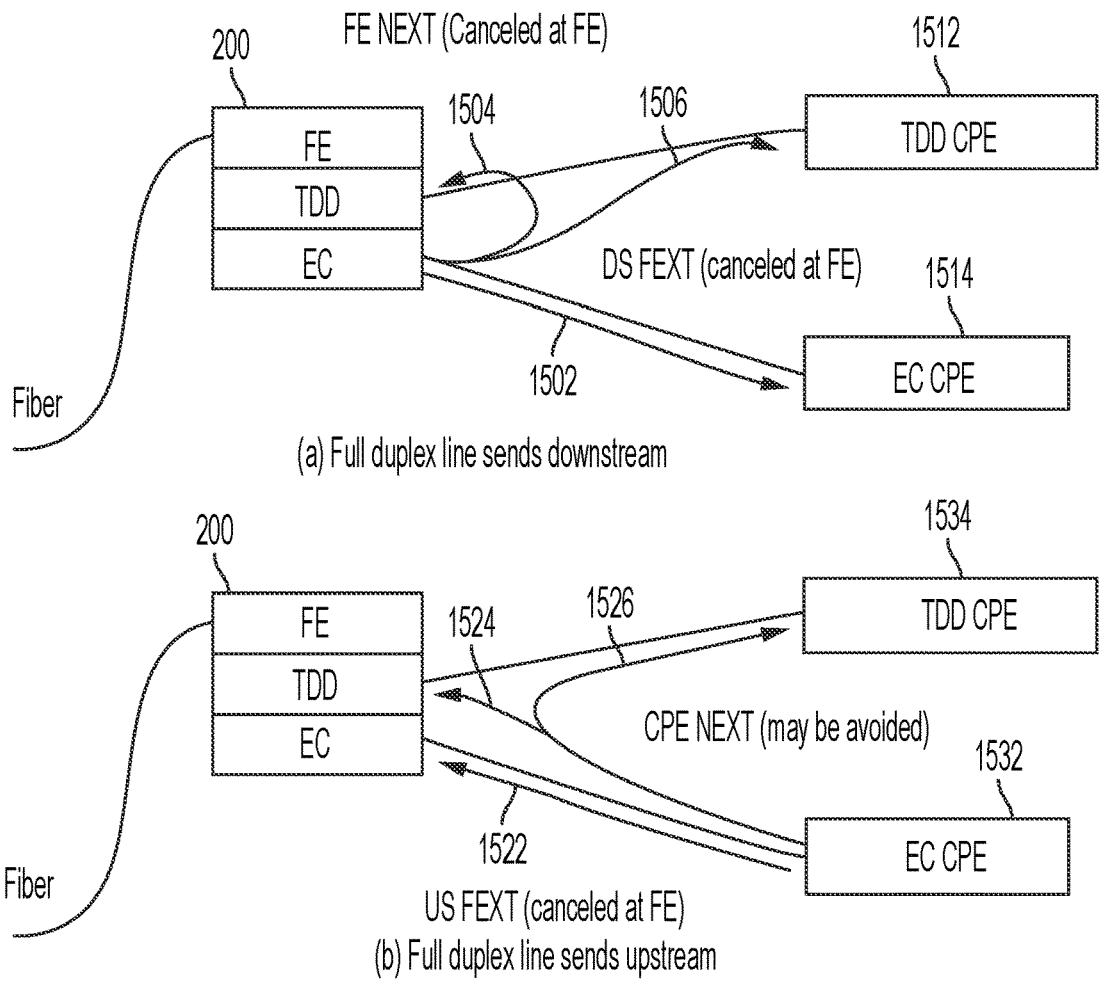
FIGS. 15(a) and 15(b) show examples of near-end crosstalk (NEXT) and far-end crosstalk (FEXT) caused by the full duplex (FDX) system to the time division duplex (TDD) system.

Since the legacy system operates in a TDD mode, if the new system uses an FDX mode, there will be, besides the usual FEXT, an additional NEXT between the systems. FIGS. 15(a) and 15(b) show examples of NEXT and FEXT caused by the FDX system to the TDD system. In FIG. 15(a), the downstream transmission 1502 from the network device 200 to the CPE 1514 will create NEXT 1504 into the upstream transmission from the legacy CPE 1512 to the network device 200. This NEXT can be cancelled in the network device 200. The downstream transmission 1502 from the network device 200 to the new CPE 1514 in FIG. 15(a) will cause FEXT 1506 to the downstream transmission to the legacy CPE 1512. This FEXT 1506 can be cancelled by the network device 200.

In FIG. 15(b), the upstream transmission 1522 from the CPE 1532 causes FEXT 1524 to the upstream transmission from the legacy CPE 1534 to the network device 200. This FEXT 1524 can be cancelled at the network device 200. The upstream transmission 1522 from the CPE 1532 causes NEXT 1526 to the downstream transmission from the network device 200 to the legacy CPE 1534. This NEXT 1526 is at the CPE side, and will impact the downstream performance of the legacy system. This NEXT 1526 cannot be cancelled because CPEs 1532, 1534 are not co-located. Thus, this NEXT 1526 should be avoided. In one example, the network device 200 may use TDD on frequencies that are mutual between the CPEs using FDX and the CPEs using TDD.

Figure 16:
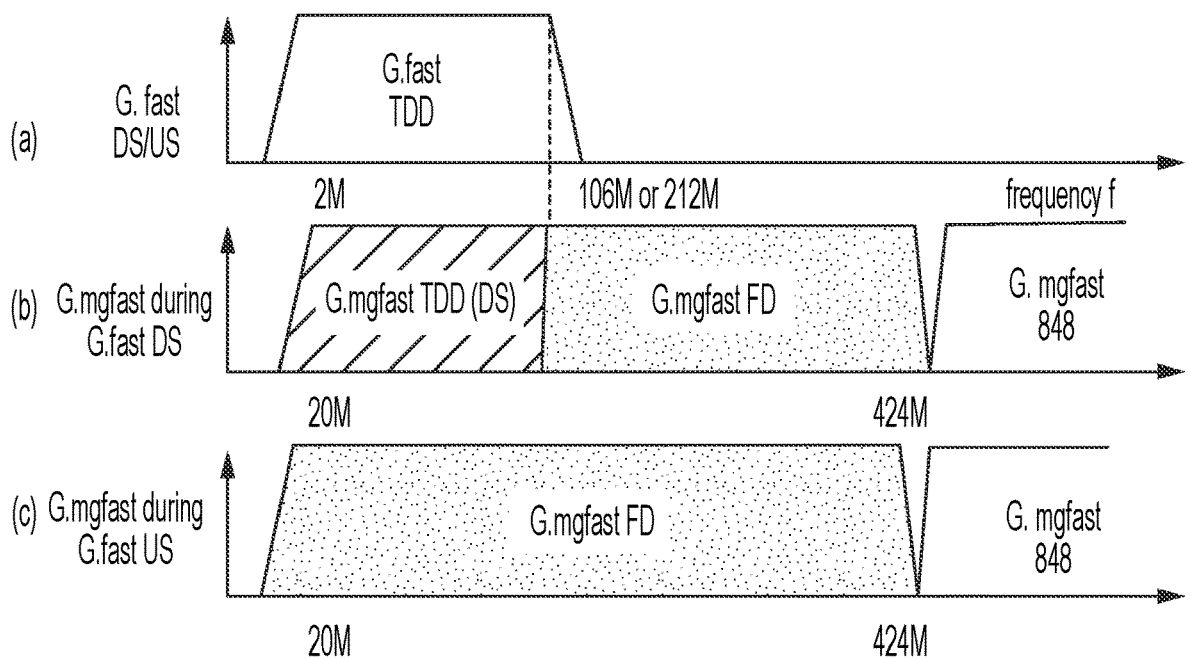
FIGS. 16(a)-(c) show an example spectrum use of the legacy system (G.fast) and the new system.

In another example, the upstream transmission of the new system (the upstream transmission 1522 in FIG. 15(b)) may be restricted during the downstream transmission of the legacy system on frequencies that are used by the legacy system. FIGS. 16(a)-(c) show an example spectrum use of the legacy system (G.fast) and the new system. FIG. 16(a) shows the spectrum used by the legacy system (e.g. below 106 MHz or 212 MHz). FIG. 16(b) shows the spectrum used by the new system (G.mgfast) during the downstream (DS) transmissions of the legacy system, and FIG. 16(c) shows the spectrum used by the new system during the upstream (US) transmissions of the legacy system. As shown in FIG. 16(b), for the frequencies not used by the legacy system (e.g. the frequency band above 106 MHz or 212 MHz), the network device 200 may operate in full duplex without restrictions. For the frequency used by the legacy system (e.g. the frequency band below 106 MHz or 212 MHz), the new system upstream transmissions may be restricted (e.g. not transmitted) during the downstream transmissions in the legacy system. This restriction may be imposed during the legacy downstream transmissions, and during the legacy upstream transmissions, the new system may operate without restrictions as shown in FIG. 16(c).

FIGS. 17(a)-17(e) show an example of the legacy system and the new system frame structure and upstream and downstream transmissions under the restriction explained above. The legacy system (G.fast) operates in a TDD mode (i.e. the time is divided into DS and US sections and the transmission occurs either in DS or US at any given time). The new system operates in an FDX mode (or a TDD mode) and the DS and US transmissions may occur simultaneously. FIGS. 17(a) and 17(b) show a legacy downstream transmission during the DS section and a legacy upstream transmission during the US section, respectively. FIG. 17(c) shows the new system downstream transmissions, which can be transmitted without restriction. FIG. 17(d) shows the new system upstream transmission in a frequency band mutual to the legacy system. As shown in FIG. 17(d), the upstream transmission in the new system stops when there is a legacy downstream transmission (in response to a control signal from the network device 200 (i.e. the processor 220)), but may be transmitted during the US section. Alternatively, the upstream transmission in the new system may be transmitted with a reduced transmit power when there is a legacy downstream transmission (in response to a control signal from the network device 200 (i.e. the processor 220)). FIG.

17(e) shows the new system upstream transmission in a frequency band not mutual to the legacy system. In this case, the upstream transmission in the new system may be transmitted without restriction.

Figure 17:
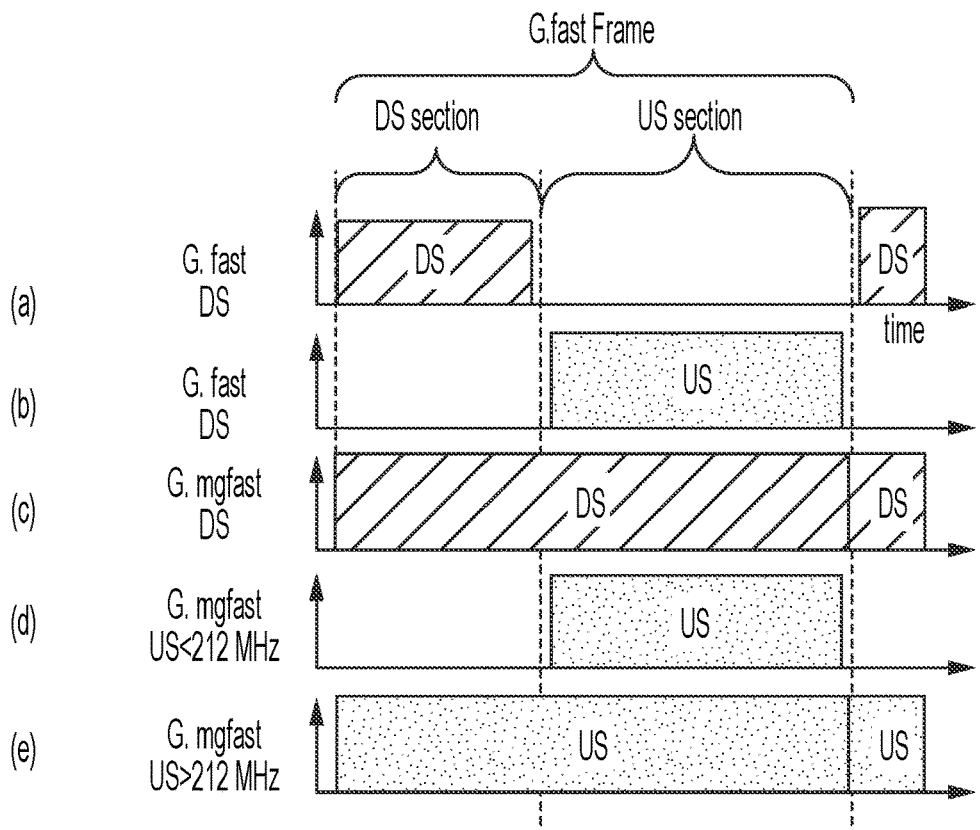
FIGS. 17(a)-17(e) show an example of the legacy system and the new system frame structure and upstream and downstream transmissions.

As shown in FIG. 17, the upstream and downstream transmissions in the TDD system are usually not aligned and there is a fixed time offset between the upstream and downstream transmissions. In some examples, for the FDX mode operations with echo cancellation, the upstream and downstream symbols may be aligned in time, such that echo and NEXT cancellation may be performed in a frequency domain.

Figure 18:
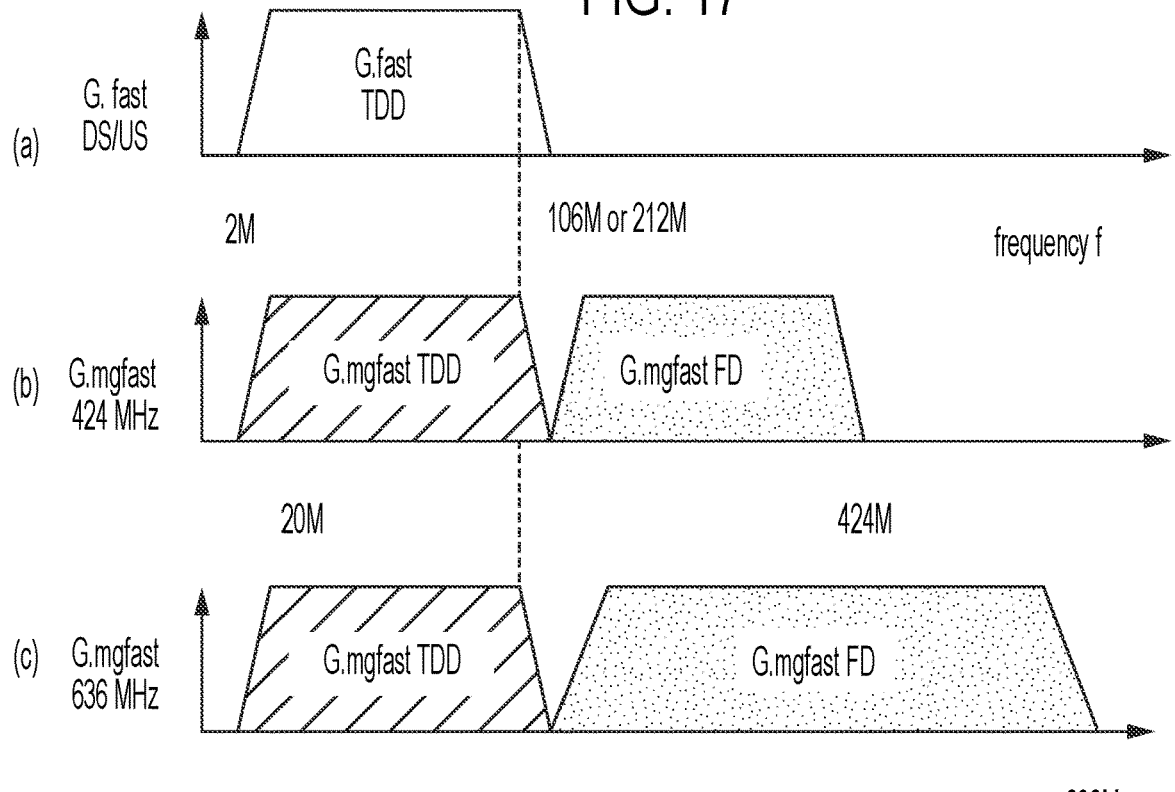
FIGS. 18(a)-18(c) show an example of spectrum use of the legacy system and the new system for different symbol alignments.

FIGS. 18(a)-18(c) show an example of spectrum use of the legacy system and the new system for different symbol alignments. In case that frequency domain filtering is used and coexistence between the TDD and the FDX system needs to be maintained, the FDX system may implement TDD in a baseband that is aligned with the legacy system, and implement FDX with echo cancellation in a higher frequency band, as shown in FIGS. 17(b) and 17(c). In this case, the DMT symbols may be arranged for TDD in the overlapping frequency band, while in the higher frequency band, full duplex with frequency domain echo cancellation is used and the upstream and downstream symbols may be aligned.

Point-to-multipoint (P2MP) operation may be implemented in case multiple CPEs are connected to the same coaxial cable or to the same twisted pair, as shown in FIGS. 1(b) and 1(d). The examples are provided for a universal transmission scheme to work for both coax cables with multiple CPEs connected and for a twisted pair cable or cables with multiple CPEs connected. In the twisted pair cable case, crosstalk cancellation may be performed. The examples also provide methods to temporarily increase the data rate of any of the CPEs by re-using resources from other CPEs while not fully busy. These methods are also applicable for both the twisted pair cable and coax cable.

Figure 19:
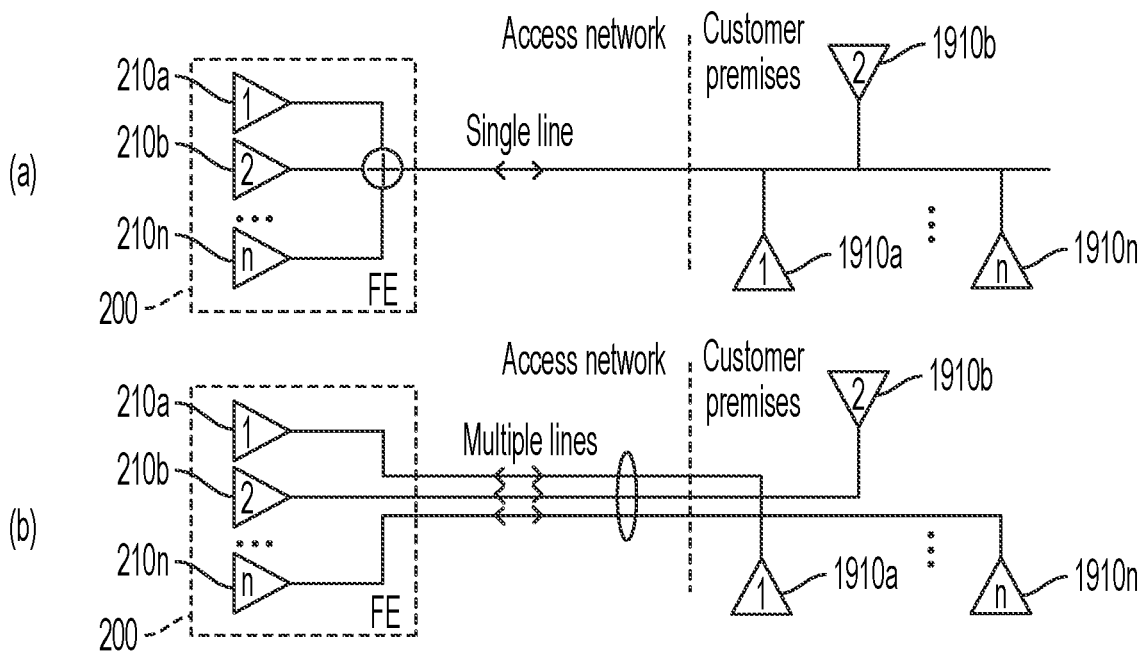
FIGS. 19(a)-19(c) show multiple CPEs connected to the network device.
Figure 19:
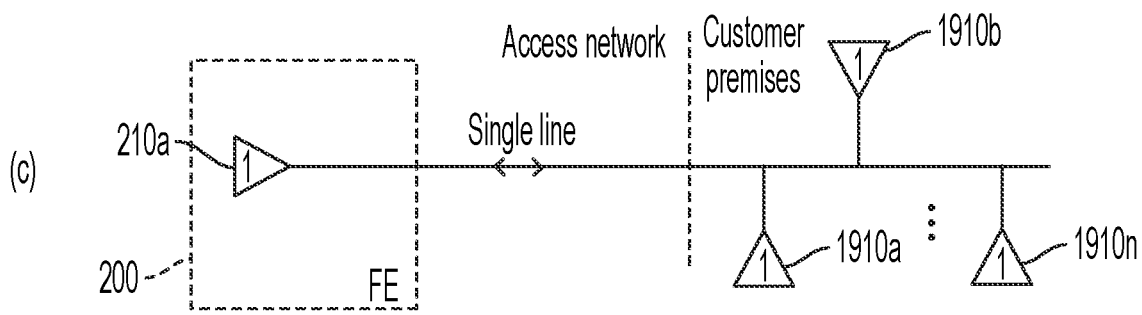

FIGS. 19(a) and 19(b) show multiple CPEs connected to the network device 200. In one example, each of the connected CPEs 1910a-1910n may use a separate channel, as shown in FIGS. 19(a) and 19(b). The channel allocated to each CPE 1910a-1910n may be one of the multi-band bonded channels as shown in FIG. 19(a) or one of the multi-line bonded channels as shown in FIG. 19(b). In another example, the connected CPEs 1910a-1910n may share a single channel (e.g. one frequency band over one wireline) as shown in FIG. 19(c).

In FIGS. 19(a) and 19(b), each transceiver 210a-210n at the network device 200 may communicate with a transceiver at a peer CPE 1910a-1910n. The transceivers 210a-210n may be setup to operate over respective channels. The channels may be established over separate twisted pairs (as shown in FIG. 3(a)) or over separate frequency bands (as shown in FIG. 3(b)). In some examples, the channels may be adjusted to provide the capacity required by a specific CPE, for example by adjusting the width of the frequency bands, coding and modulation parameters, transmit power, or the like.

In FIG. 19(c), one transceiver 210a at the network device 200, which is configured to communicate with multiple CPEs 1910a-1910n, may communicate with all (or some) of the connected CPEs 1910a-1910n. The communication with multiple CPEs 1910a-1910n may be implemented by using time division multiple access (TDMA) wherein each CPE 1910a-1910n may operate during a certain number of transmission time slots (symbol periods), by using frequency division multiple access (FDMA) wherein each CPE 1910a-1910n operates over a certain set of subcarriers, or by using a combination of TDMA and FDMA wherein both time slots and frequencies are assigned for a particular CPE 1910a-1910n. In some examples, downstream broadcast may be used such that a single transceiver of the network device 200 communicates with all connected CPEs 1910a-1910n. A robust coding and bit allocation, which can be received by all CPEs 1910a-1910n with a sufficiently low error rate, may be used for the downstream broadcast.

In case where P2MP is implemented over a twisted pair cable, extra transceivers in the network device 200 that are not connected to any CPE may use the crosstalk channels between a free line (twisted pair) and a line to which a particular CPE is connected to enhance performance of the particular CPE, which will be explained in detail below.

Figure 20:
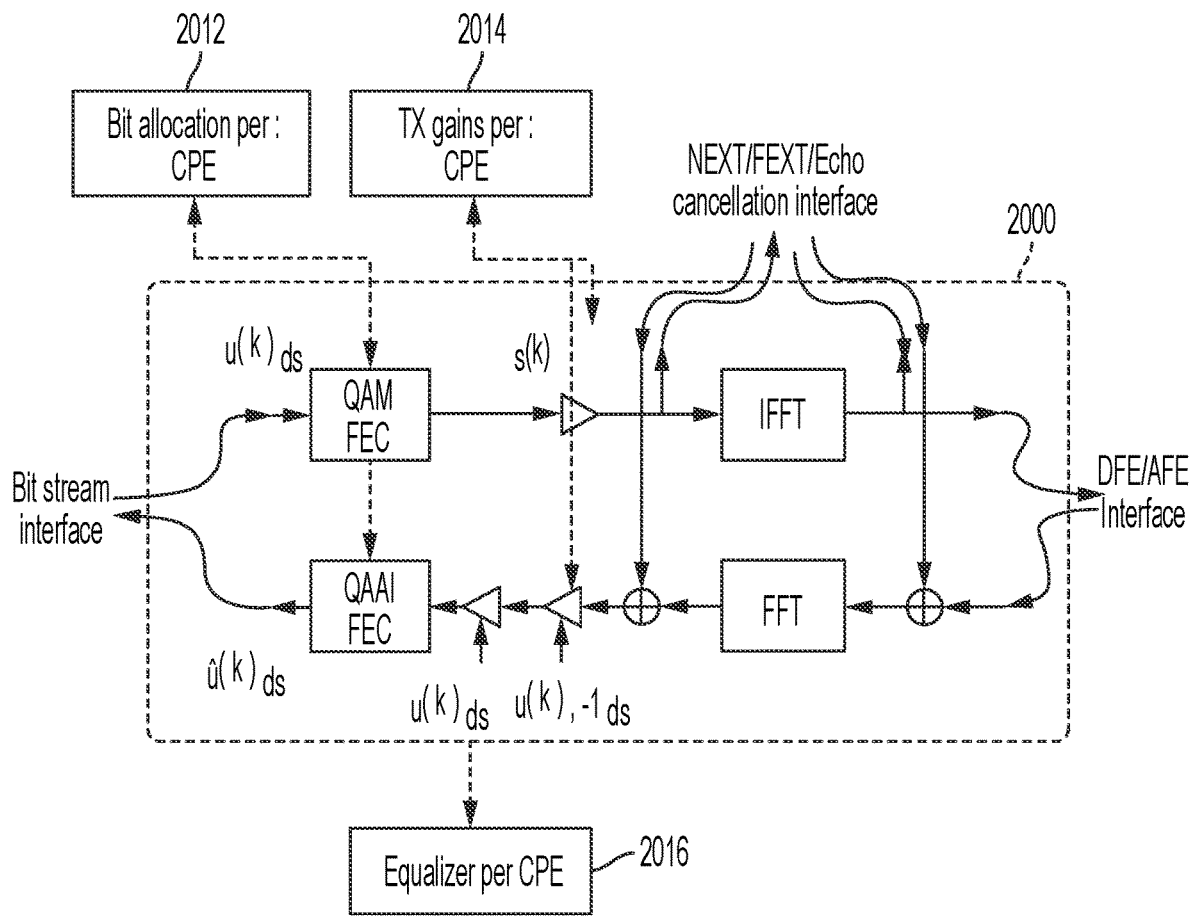
FIG. 20 shows an example structure of a DFE of a transceiver supporting P2MP.

For P2MP operations in case where the CPEs share a channel, the network device 200 may store user-specific data for multiple CPEs. The user-specific data may be channel-related information for each CPE such as filter setting, equalizer setting, modulator setting, transmit power setting, or the like. FIG. 20 shows an example structure of a DFE 2000 of a transceiver supporting P2MP. The DFE 2000 may include a memory for storing bit allocation tables 2012 and transmit gain tables 2014 for the connected CPEs. For multi-carrier modulation, the modulation scheme and transmit gain may be set for each subcarrier and this setting is stored in the bit allocation tables 2012 and transmit gain tables 2014. In one example, to reduce the memory requirements, the same bit-allocation tables or transmit gain tables may be used by the network device 200 for multiple CPEs in the downstream (i.e. bit allocation and transmit gain per CPE group). For the upstream processing, the DFE 2000 may include an equalizer 2016 for each CPE since the upstream channels may require different coefficients.

On a coax cable, frequency bands for different CPEs may be allocated statically to implement P2MP transmissions. In case where higher peak data rates are required for one or more of the CPEs, multiple bands may be bonded for those CPEs. This may be implemented by dynamically changing the assignment of the baseband and passband cannels to the CPEs.

In FIGS. 21, 23, 25, and 26, D/U1 and D/U2 indicate downstream/upstream transmissions to/from CPE 1 and CPE 2, respectively, D1 and D2 indicate downstream transmissions to CPE 1 and CPE 2, respectively, and U1 and U2 indicate upstream transmissions from CPE 1 and CPE 2, respectively.

Figure 21:
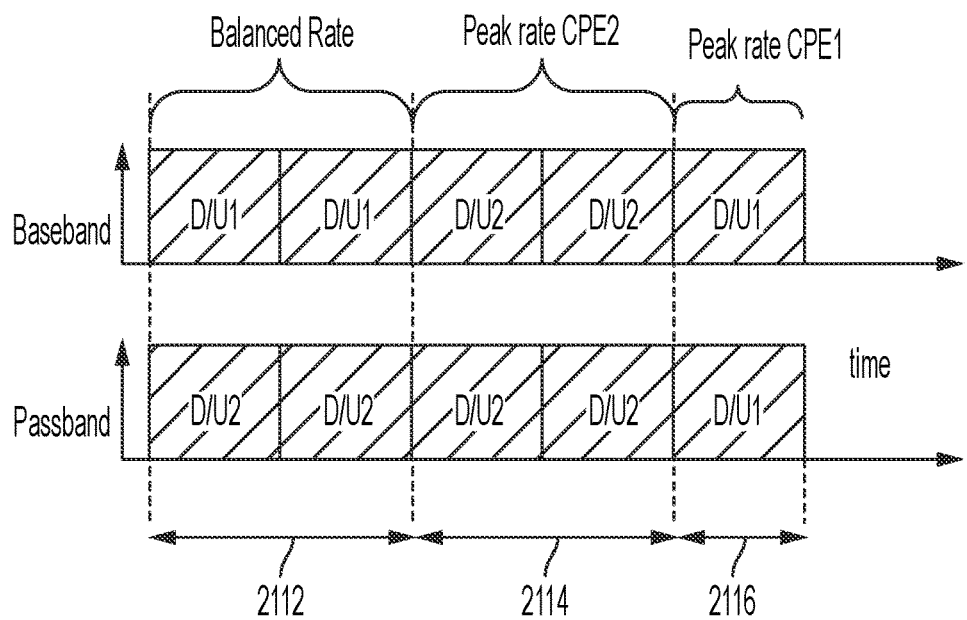
FIG. 21 shows an example of dynamic frequency band allocation by using multi-band bonding.

FIG. 21 shows an example of dynamic frequency band allocation by using multi-band bonding. During the selected time slot(s), both baseband and passband may be allocated for a single CPE to increase the data rate for the CPE. In this example for the case of two CPEs, during the time slots 2102, the first transceiver transmits to CPE 1 on baseband and the second transceiver transmits to CPE 2 on passband for balanced rate. During the time slots 2104, both transceivers are switched for transmission to CPE 2 on baseband and passband, so that the data rate on CPE 2 reaches the peak bit rate. During the time slot 2106, both transceivers are switched for transmission to CPE 1 on baseband and passband so that the data rate at CPE 1 reaches the peak (or higher) bit rate.

On a twisted pair cable, the channels are coupled by crosstalk between twisted pairs in the twisted pair cable. With strong crosstalk coupling between the lines, the crosstalk coupling from the neighboring line into one of the receivers may be used to boost the data rate of that line temporarily. FIGS. 22(a) and 22(b) show dynamic resource allocation on the twisted pairs by precoding. In FIG. 22(a), the two twisted pairs 2202, 2204 serve for two CPEs simultaneously (line 2202 for CPE 1 and line 2204 for CPE 2). As shown in FIG. 22(b), line 2204 for CPE 2 may be switched temporarily to provide a higher data rate to CPE 1. For example, the same transmission may be transmitted via both line 2202 and line 2204 so that the SNR of line 2202 is increased by adding more signal power to the receiver via crosstalk from line 2204.

Figure 23:
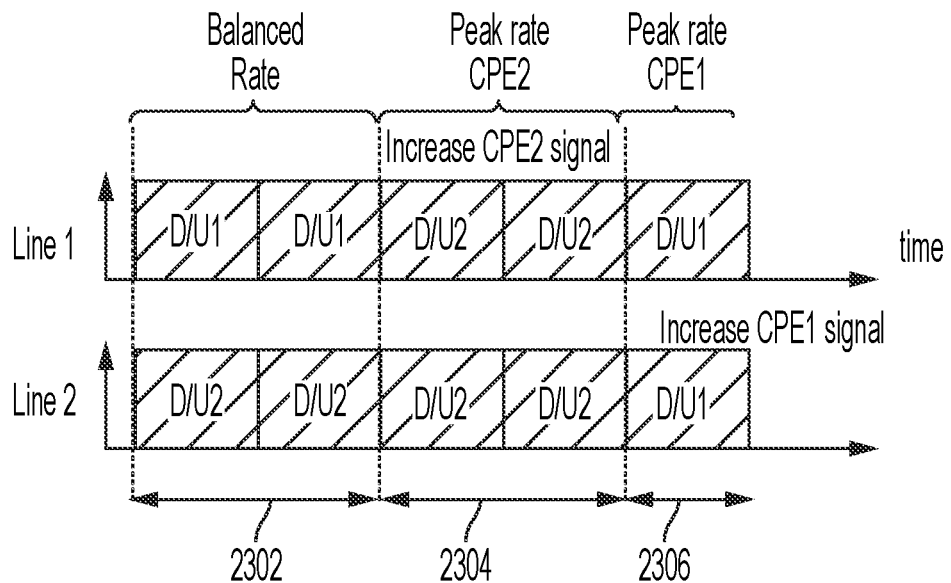
FIG. 23 shows dynamic data frame format for temporary data rate increase for the twisted pair application.

FIG. 23 shows dynamic data frame format for temporary data rate increase for the twisted pair application. During time slots 2302, the transceivers serve CPE 1 and CPE 2 on lines 1 and 2, respectively. During time slots 2304, line 1 is switched for CPE 2 such that the data rate at CPE 2 is increased via crosstalk from line 1 and CPE 1 receives a blank frame (i.e., CPE 1 ignores the received signal). During time slot 2306, line 2 is switched for CPE 1 such that the data rate at CPE 1 is increased via crosstalk from line 2 and CPE 2 receives a blank frame (i.e., CPE 2 ignores the received signal).

Figure 24:
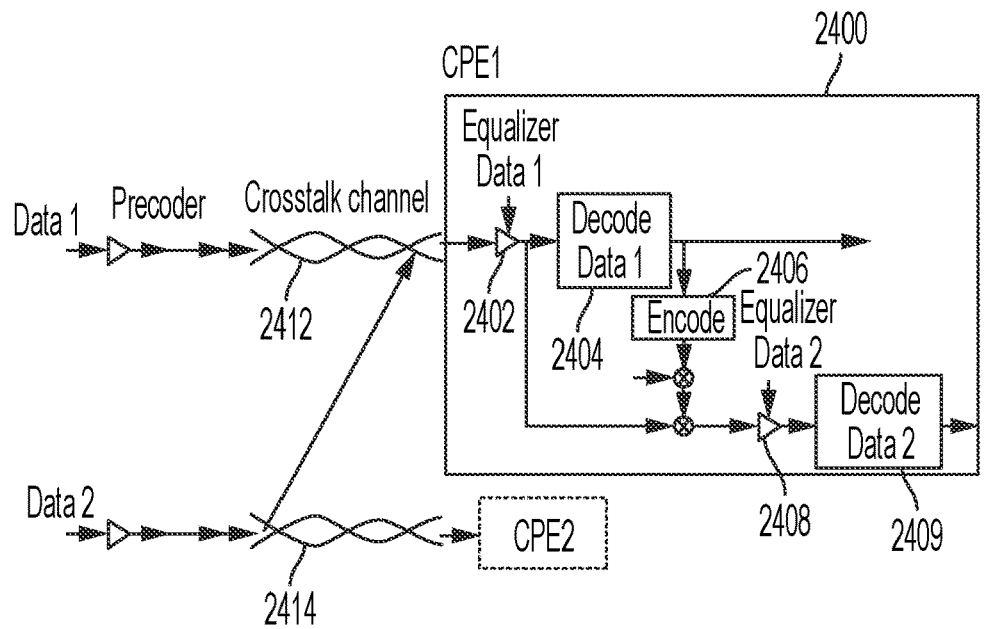
FIG. 24 shows an example of a transceiver of CPE for channel bonding.

In FIG. 22(b), one logical transmission channel may be present for a CPE while in the peak rate operation, and the SNR of one line is increased by adding more signal power to the receiver on the corresponding line via the crosstalk channel. Alternatively, an equalizer (e.g. a decision feedback equalizer) may be included in the CPE and two (or more) logical channels may be transmitted to a single CPE on the same line on the same frequency. FIG. 24 shows an example of a transceiver 2400 of CPE for channel bonding. In FIG. 24, the network device 200 sends data 1 to CPE 1 over a direct channel (i.e. via line 2412) and data 2 to CPE 1 over a crosstalk channel (i.e. via line 2414). The data 1 signal and the data 2 signal are combined on line 2412 by crosstalk, and CPE 1 receives the combined signals. CPE 1 obtains data 1 using a first equalizer 2402 and a first decoder 2404. CPE 1 then encodes data 1 with an encoder 2406 and subtracts the encoded data 1 from the received data. CPE 1 then obtains data 2 using a second equalizer 2408 and a second decoder 2409. With this scheme, multiple data channels may be transmitted to one CPE on the same time and frequency.

Figure 25:
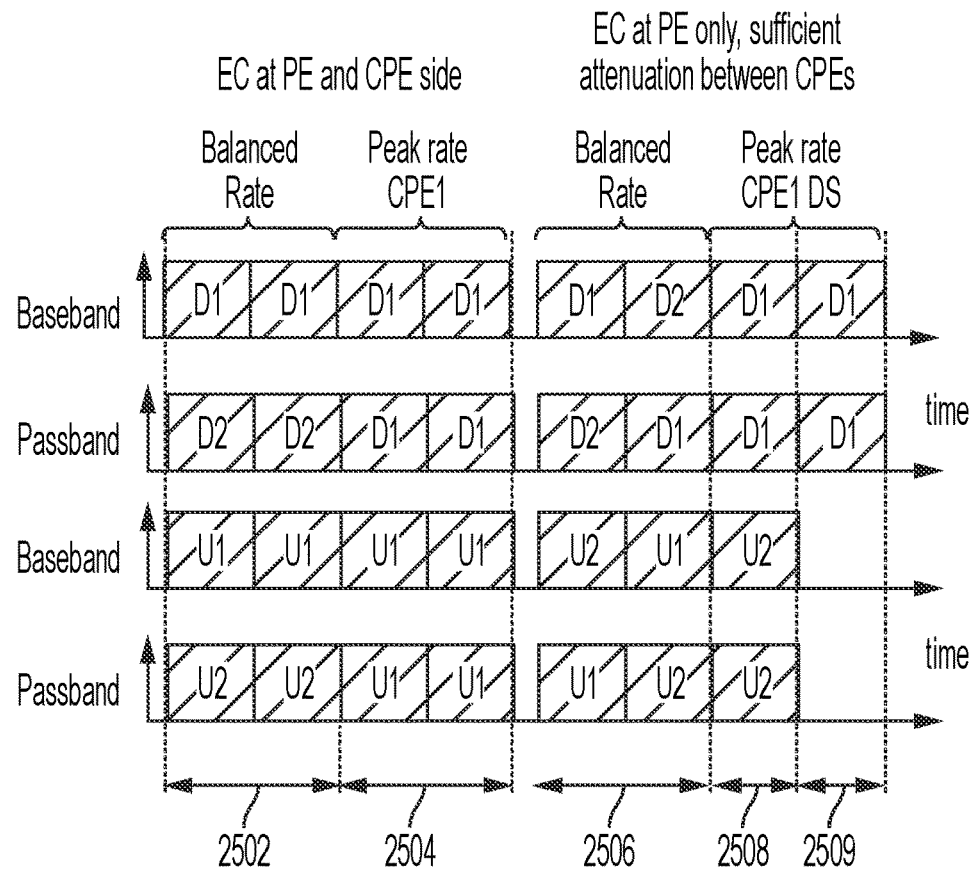
FIG. 25 shows example frame formats for full duplex P2MP operations on a coax cable with a splitter.

When implementing full duplex transmission, upstream and downstream transmissions may be allowed at the same time and frequency band. FIG. 25 shows example frame formats for full duplex P2MP operations on a coax cable with a splitter. Assuming that echo cancellation removes most of the echo signal and echo cancellation is performed both at the CPE side and at the network device side, the same transmit time slots and frequency bands may be allocated for upstream and downstream transmissions as shown on the left side of FIG. 25. For example, for the balanced rate, during time slots 2502, upstream and downstream transmissions for CPE 1 may be allocated on baseband and upstream and downstream transmissions for CPE 2 may be allocated on passband. For providing a peak rate for CPE 1, during time slots 2504, the upstream and downstream transmissions for CPE 1 may be allocated both on baseband and passband.

If echo cancellation is performed at the network device side and not at the CPE side (the right side of FIG. 25), upstream and downstream transmissions may not be assigned to the same CPE at the same time slot and frequency band. With sufficient attenuation of the near-end crosstalk channels from the transmitting CPE to the receiving CPEs, full duplex transmission may be implemented. For example, a CPE may transmit upstream at one frequency band and receive downstream at another frequency band. For example, for the balanced rate, during time slots 2506, upstream and downstream transmissions for CPE 1 may be allocated on baseband and passband, respectively, and upstream and downstream transmissions for CPE 2 may be allocated on passband and baseband, respectively. For providing a peak rate for CPE 1 in downstream direction, downstream channels may be allocated to CPE 1 on both baseband and passband as shown in time slots 2508, 2509. To further increase the downstream data rate, the upstream transmission of CPE 2 may be stopped as shown in time slot 2509.

On a twisted pair cable, each CPE may be connected to one or more twisted pairs in a twisted pair cable individually, but there is crosstalk between twisted pairs in the twisted pair cable. In case of full duplex transmission, near-end crosstalk from upstream transmissions between different CPEs may not be canceled and the un-canceled crosstalk reduces the downstream data rates. For the downstream transmission, near-end crosstalk may be canceled.

Figure 26:
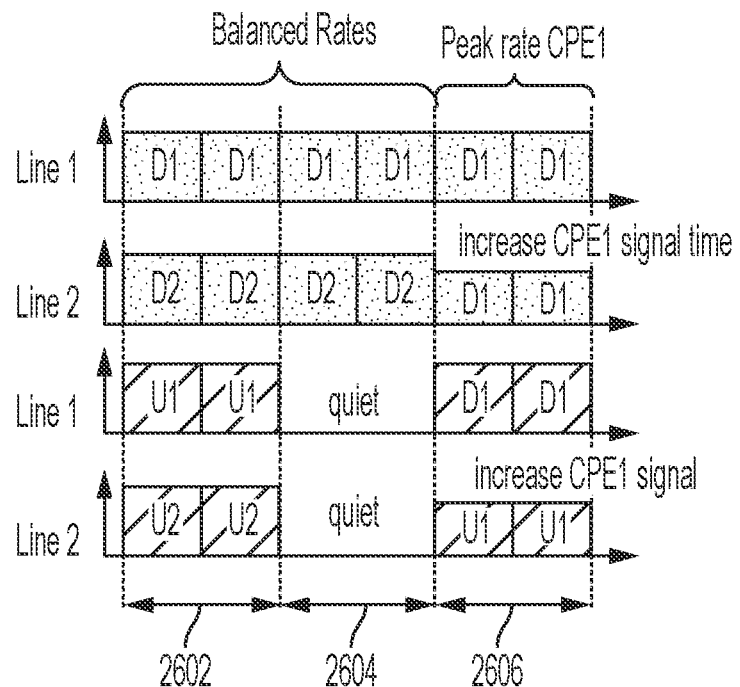
FIG. 26 shows an example frame format for full duplex operations on multiple twisted pairs of a binder serving multiple CPEs.

FIG. 26 shows an example frame format for full duplex operations on multiple twisted pairs in a binder serving multiple CPEs. During time slots 2602, the upstream transmissions from CPE 1 and CPE 2 may cause near-end crosstalk to downstream transmissions to the other CPE, and they may be transmitted simultaneously if the crosstalk is not strong. To achieve higher downstream data rates in this case, during certain time slots (e.g. time slots 2604), upstream transmissions may stop and the time slots may be allocated for downstream transmissions only so that the NEXT at CPE is avoided. To control the upstream/downstream ratio, a part of the TDD frame (e.g. time slots 2602) may be transmitted with echo cancellation (upstream and downstream at the same time) and another part of the TDD frame may be transmitted with only downstream (e.g. time slots 2604), which gives higher downstream rates. This gives balanced data rates on all lines (lines 1 and 2 in the example of FIG. 25).

To achieve a high peak data rate on one of the lines, (e.g., line 1 in the example), both lines may transmit the same downstream signal for one line (e.g. during time slots 2606) so that the corresponding receive signal is improved by constructive interference. In upstream, the transmission on line 1 will be coupled onto line 2, and the network device 200 may combine the signals on two lines for decoding. When only one line is served (in time slots 2606), there is no NEXT and therefore no negative impact of transmitting upstream and downstream at the same time.

Figures 27A, 27B:
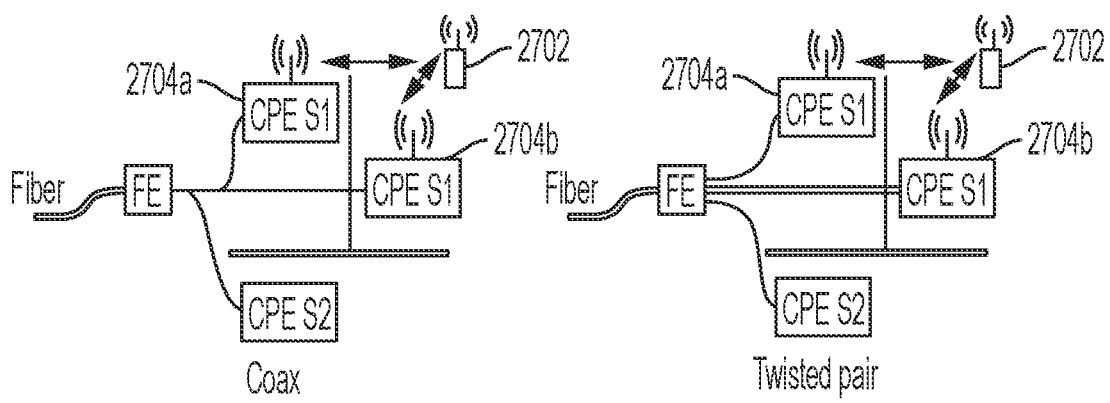
FIGS. 27(a) and 27(b) show examples of in-home distribution of Internet traffic to a mobile device in a coax cable network and a twisted pair cable network, respectively.

Much of the data traffic in the access network may be consumed by a mobile device, which is connected to a CPE (e.g., a gateway or a router in a WIFI network). To achieve a good coverage of network with WIFI, multiple CPEs per subscriber may be installed at the customer's premise. As mobile devices move from one CPE to another, each CPE may consume the full bandwidth of the subscriber. FIGS. 27(a) and 27(b) show examples of in-home distribution of Internet traffic to a mobile device in a coax cable network and a twisted pair cable network, respectively. A mobile device 2702 may be connected to one of the CPEs 2704a, 2704b, and for a good quality of service of the in-home WIFI, traffic may be routed to the mobile device 2702 dynamically over one of the CPEs 2704a, 2704b that is selected by the network device 200, e.g. with the best connection to the mobile device.

In some examples, a CPE may obtain, and report to the network device 200, at least one of its subscriber ID, a CPE ID, the number of bonded channels that can be received by the CPE, the requested upstream (US) and downstream (DS) bit rate, or the like. Each bonded channel may operate in a high peak rate mode or a balanced rate mode, for example as shown in FIG. 25 or 26. The achieved rates in one or both modes may be reported to the network device 200.

The network device 200 may assign resources to CPEs dynamically, for example based on the current demand of each CPE, the capabilities of the CPEs, the maximum data rate to be consumed for each subscriber or CPE, or the like. Example resource allocation for the coaxial cable case (FIG. 27(a)) and twisted pair cable case (FIG. 27(b)) are shown in Tables 1 and 2, respectively.

TABLE 1

| | Subscriber | Channels | Rates |
|---|---|---|---|
| CPE1 | 1 | 1, 2 | 1: 2.5 G up, 2.5 G down |
| | | | 2: 2.5 G up, 2.5 G down |
| CPE2 | 1 | 1, 2 | 1: 2.5 G up, 2.5 G down |
| | | | 2: 2.5 G up, 2.5 G down |
| CPE3 | 2 | 1, 2 | 1: 2.5 G up, 2.5 G down |
| | | | 2: 2.5 G up, 2.5 G down |

TABLE 2

| | Subscriber | Channels | Rates |
|---|---|---|---|
| CPE1 | 1 | 1 | 1(base): 1 G up, 1 G down |
| | | | 1(peak): 2 G up, 2 G down |
| CPE2 | 1 | 2, 3 | 2(base): 1 G up, 1 G down |
| | | | 2(peak): 2 G up, 2 G down |
| | | | 3(base): 1 G up, 1 G down |
| | | | 3(peak): 2 G up, 2 G down |
| CPE3 | 2 | 4 | 4(base): 1 G up, 1 G down |
| | | | 4(peak): 2 G up, 2 G down |

The network device 200 may assign transmission opportunities and channels to CPEs dynamically based on predetermined criteria, for example, traffic request information with respect to a CPE. The transmission opportunities may be a set of multi-carrier modulation symbol positions in a logical frame at which data transmission is allowed. The transmission opportunities may be a fraction of or multiple of time slot, subframe, frame, or the like. The traffic request information may be generated by a CPE based on a particular customer application, and communicated to the network device 200 via a management channel. In some examples, this information may be sourced by the service provider via the corresponding management channel or via network management system (NMS) controls.

A transmission frame transmitted from the network device 200 to CPEs in a time slot accessible to (all) CPEs may include information regarding a pattern of transmission opportunities for the CPEs, where different CPEs may be served for a certain time fraction of the transmission frame (e.g. transmission opportunities). Each time fraction (T1, T2, . . . ) may be one or more of multi-carrier modulation symbols, (e.g. consecutive OFDM or DMT symbols in the transmission frame). Example arrangements of transmission opportunities corresponding to FIGS. 27(a) and 27(b) are shown in Tables 3 and 4, respectively. In Tables 3 and 4, C1, C2, C3 mean CPE 1, CPE 2, and CPE 3, respectively.

TABLE 3

| Time | T1 | T2 | T3 | T4 | T5 | T6 |
|---|---|---|---|---|---|---|
| Ch1, DS | C1, 2.5 G | C2, 2.5 G | C1, 2.5 G | C1, 2.5 G | C2, 2.5 G | C3, 2.5 G |
| Ch1, US | C1, 2.5 G | C2, 2.5 G | C1, 2.5 G | C1, 2.5 G | C2, 2.5 G | C3, 2.5 G |
| Ch2, DS | C3, 2.5 G | C3, 2.5 G | C2, 2.5 G | C1, 2.5 G | C2, 2.5 G | C3, 2.5 G |
| Ch2, US | C3, 2.5 G | C3, 2.5 G | C2, 2.5 G | C1, 2.5 G | C2, 2.5 G | C3, 2.5 G |

TABLE 4

| Time | T1 | T2 | T3 | T4 |
|---|---|---|---|---|
| Ch1, DS | C1, 1 G | C1, 2 G | C1, 0 | C1, 0 |
| Ch1, US | C1, 1 G | C1, 2 G | C1, 0 | C1, 0 |
| Ch2, DS | C2, 1 G | C2, 0 | C2, 2 G | C2, 0 |
| Ch2, US | C2, 1 G | C2, 0 | C2, 2 G | C2, 0 |
| Ch3, DS | C3, 1 G | C3, 0 | C3, 2 G | C3, 0 |
| Ch3, US | C3, 1 G | C3, 0 | C3, 2 G | C3, 0 |
| Ch4, DS | C4, 1 G | C4, 0 | C4, 0 | C4, 2 G |
| Ch4, US | C4, 1 G | C4, 0 | C4, 0 | C4, 2 G |

The transmit time fraction associated with each CPE may be dynamically adjusted, for example, with respect to the current traffic status. The adjustment may be via the medium access plan (MAP) sourced by the network device 200 in response to requests of different CPEs or as a default setting from the service provider (via the management information base (MIB)).

The MAP may be broadcasted by the network device 200 to all CPEs. The broadcast may be via a broadcast channel that all CPEs can receive or via an individual channel to a CPE independently. A channel may be a dedicated frequency band on a coax cable or on a twisted pair, or a dedicated twisted pair in a twisted pair cable. The MAP contains the medium access information for the corresponding channel.

The MAP may divide the transmission frame into multiple transmission opportunities (sections). The MAP for each transmission opportunity may contain information on at least one of a start symbol (multi-carrier symbol such as DMT or OFDM symbol) index, an end symbol index, a frequency range of used subcarriers, a pointer to bit allocation and gain settings (stored at the CPE), the ID of the destination CPE (and subscriber), or the like. Alternatively, the MAP may assign the bit allocation and CPE ID for each symbol in the transmission frame (thus, no start symbol/end symbol information may be needed). The MAP may be transmitted at a known and fixed time position in the transmission frame or at known frequencies.

In some examples, preconfigured symbols known to the CPEs and the network device 200 (e.g. synchronization symbols, etc.) may be transmitted at predefined time interval for channel estimation and for training a crosstalk precoder and near-end and far-end crosstalk cancelers. The preconfigured symbols may be sent on a particular known frequency or frequencies.

Figure 28A:
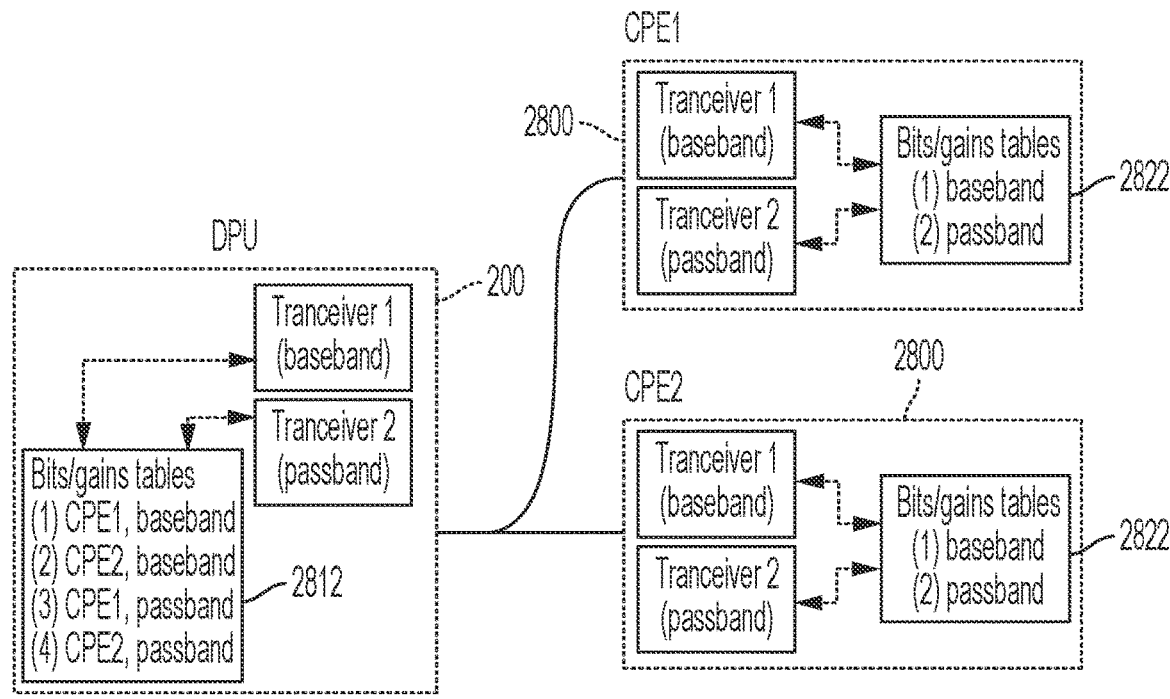
FIGS. 28(a) and 28(b) show examples of bits and gains table management.
Figure 28B:
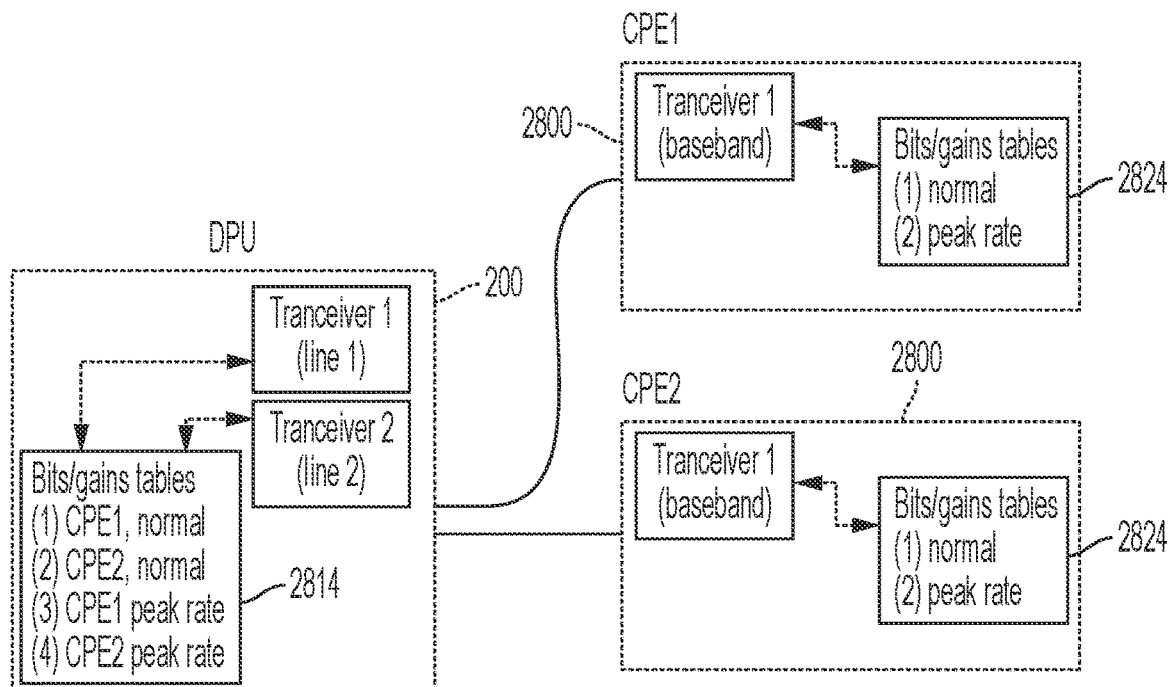

For optimized performance and to avoid performance degradation due to narrowband disturbers, the bit allocation and the transmit gains may be determined per subcarrier or for small subcarrier groups, (e.g., 2, 4, or 8 subcarriers). For the P2MP application on a coax cable, the same frequency band may be assigned to different CPEs, while each CPE may experience different signal attenuation and noise conditions. Therefore, different bit allocation and gains settings may be applied for different CPEs. FIG. 28 shows an example of bits and gains table management. FIG. 28(a) shows bit allocation and gains settings for analog front end using mirror frequencies for passband transmissions, and FIG. 28(b) shows bit allocation and gains settings for analog front end using a mixer for passband transmissions. The network device 200 includes bit allocation and gains tables 2812, 2814 for each CPE and for each configuration of the transceivers (e.g. different bit allocation and gain settings for different frequency bands and data rate (normal or peak)). Each CPE 2800 also includes the corresponding bit allocation and gains tables 2822, 2824 for the CPE for each configuration of the transceivers.

Figure 22:
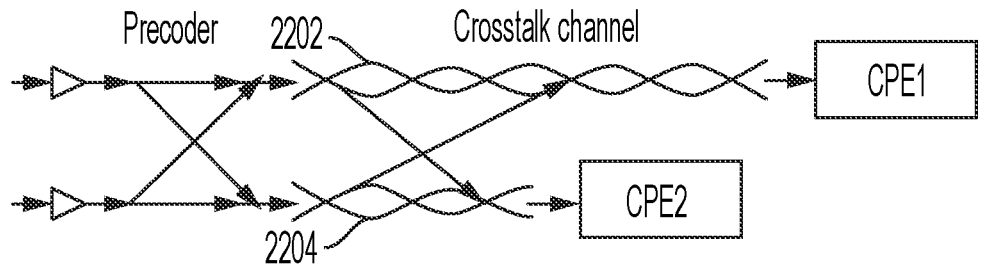
FIGS. 22(a) and 22(b) show dynamic resource allocation on a twisted pair cable by precoding.
Figure 22:
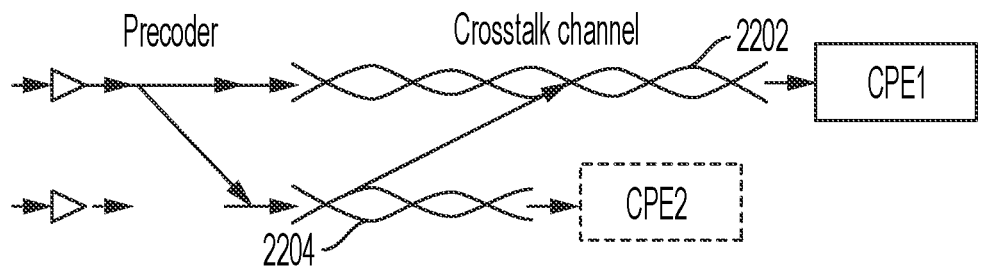

On a twisted pair cable, different bit allocation tables may be used for each of the bonded channels (for each twisted pair) to benefit from rate improvements with the rate boosting which is shown in FIG. 22, where the received signal for one line is boosted with the transmissions on another line(s).

In case where the same twisted pair is connected to multiple CPEs and each CPE uses a particular set of time slots, the bit loading and gain tables may be different for different time slots. The time slots may be associated with particular CPEs in TDMA, and each time slot may be associated with a particular CPE and some time slots may be associated with more than one CPE. The network device 200 may store multiple bit loading and gains tables and apply a different bit allocation and gain setting per transmission time slot (or a number of consequent symbols in a transmission frame).

The bit allocation table may be changed from one table to another when the rate boosting is enabled or when data is transmitted to different CPEs over the same channel. However, it may be assumed that the SNR for a given setting changes slowly. Thus, multiple bit allocation and gains tables may be stored at the network device and the CPEs and updated with seamless rate adaptation commands, while the bit allocation and gains table to be used for the next symbols is selected as indicated in the MAP. This reduces the communication overhead for the exchange of bit allocation and gains tables between the network device 200 and the CPE.

A new CPE may be added to the existing network in a customer's premise. To add a new CPE to the network without interruption of service for existing active CPEs, a training sequence (a sequence of signals that is known to the CPE and the network device and used for channel estimation) may be transmitted on the network. A handshake procedure may be initiated between the network device 200 and a new CPE at a predefined frequency. The network device and the new CPE may exchange information such as supported frequency channels, available resources, and required services of the new CPE, or the like, and negotiate available resource sharing (e.g. the number of timeslots, frequency bands, etc.) in the downstream or in both upstream and downstream.

The transmit time slots and frequency channel for the downstream training sequence may be assigned to the new CPE during the handshake. The network device may send the training sequence at the assigned time slot and frequency channel. The new CPE receives the training sequence and synchronizes to that (if crosstalk cancellation is involved, the sync symbols (symbols that are transmitted periodically for synchronization) may be transmitted during this stage.

The transmit time slots and frequency channel for upstream training sequence may be assigned during the initial handshake. Alternatively, the transmit time slots and frequency channel for upstream training sequence may be communicated in the initial downstream training sequence by the network device 200. The upstream training channel is established when the CPE is synchronized with the network device signal. The CPE may join the network by sending sync symbols to estimate the upstream crosstalk channel and assist the network device in cancellation of the upstream crosstalk.

After the initial synchronization and training of downstream and upstream transceivers and the NEXT/FEXT cancelers, the transmission parameters may be assigned to the CPE. For improvement of channel quality, the channel may be measured by the CPE and the network device and parameters such as modulation settings, bit allocation, transmit power setting, or the like may be configured or adjusted by the network device based on measurements (e.g. interference, signal-to-noise ratio (SNR), etc.). Additional transmission channels on the coax cable or on the twisted pair cable may be measured in the later training stages or trained during the showtime (DSL showtime). The showtime is the state in which either the transceiver of the network device or the CPE may send bearer channel data after the initialization procedure has been completed.

In case where multiple CPEs want to train simultaneously, different channels may be assigned to the CPEs or they may use different transmission timeslots of the transmission frame on the same channel.

Vectoring technology measures the crosstalk from all other lines in twisted pairs in a twisted pair cable and attempts to remove the crosstalk by generating anti-phase signals to cancel out the crosstalk signals. To calculate crosstalk, vectoring technology measures and cancels interference across the lines over the full frequency spectrum they occupy. A vectored group is a set of lines over which transmission from the network device 200 (i.e. DPU) is eligible to be coordinated by pre-coding (downstream vectoring), or over which reception at the network device 200 is eligible to be coordinated by post-cancellation (upstream vectoring), or both. Depending on the configuration of the vectored group, downstream vectoring, upstream vectoring, both, or none may be enabled.

Figure 29:
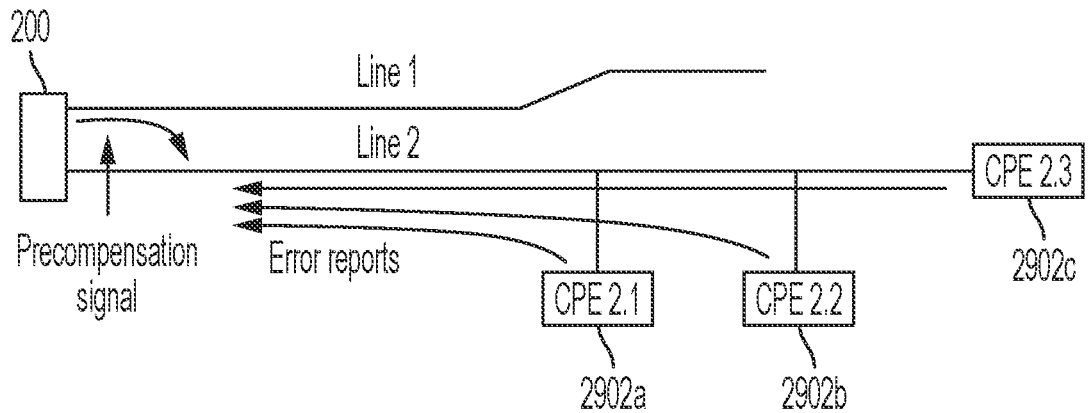
FIG. 29 shows an example of sending multiple error reports to the network device by multiple CPEs.

For downstream vectoring, reporting of error samples may be performed by multiple CPEs. FIG. 29 shows an example of sending multiple error reports to the network device 200 by multiple CPEs 2902a-2902c. Different CPEs 2902a-2902c may send different error reports since the attenuation to different CPEs 2902a-2902c may be different. There may be enough capacity available for each CPE for error reporting. A vectoring control entity (VCE) in the network device 200 may combine these reports, assuming the FEXT channel to all CPEs 2902a-2902c is the same (e.g. since FEXT is coupled outside the residence). When one CPE is receiving, all other CPEs may be in a receive mode (even if not receiving) to keep the signal channel and the crosstalk channel unchanged due to impedance changes (unless the CPE receiver impedance does not change when the receiver is turned off), i.e. the other CPEs keep the impedance constant (same as when they are in a receive mode). It is assumed that all CPE receivers are on during the sync symbol and during the robust management channel (RMC) symbol. RMC is transmitted in broadcast mode to all CPEs. To have RMC with FEXT cancelled, channel estimation may be done with all CPEs turned on.

Alternatively, the network device 200 may assign a particular CPE or CPEs for error reporting and update this assignment when needed (e.g., the assigned CPE is disconnected). The initial assignment may be performed during the handshake and may be updated during initialization and during the showtime.

Figure 30:
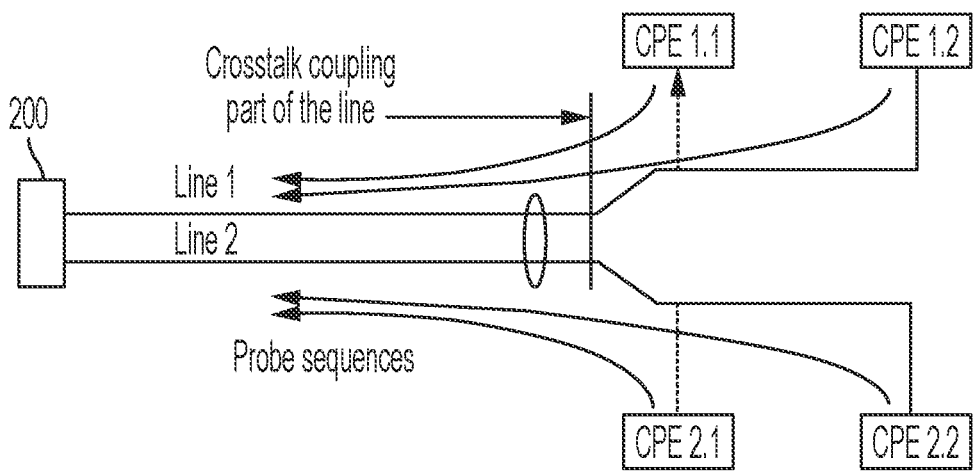
FIG. 30 shows an example of sending probe sequences for upstream crosstalk estimation over two cables where two CPEs are connected to each line.

An upstream sync symbol may be sent by different CPEs. Unlike in the downstream, one CPE may transmit while other CPEs stay idle or be in a receive mode. Due to this, the impedance of the in-home wiring towards the line may change when a particular CPE starts transmission. Due to a change in the impedance of home wiring, the crosstalk channel may change as well. Thus, the network device 200 may need to handle different upstream crosstalk matrices for different combination of transmitting CPEs. FIG. 30 shows an example of sending probe sequences for upstream crosstalk estimation over two cables where two CPEs are connected to each line (CPE 1.1 and CPE 1.2 to line 1, and CPE 2.1 and CPE 2.2 to line 2). Sync symbols carry a probe sequence during initialization and showtime. Each element in the probe sequence is from the finite set {−1, 0, 1}. The length and content of a probe sequence are determined by the VCE in the network device 200. In this example, the network device may handle four matrices for the following combinations of transmitting CPEs: (1) CPE 1.1 and CPE 2.1, (2) CPE 1.2 and CPE 2.1, (3) CPE 1.1 and CPE 2.2, and (4) CPE 1.2 and CPE 2.2. This list does not include the case of discontinuous operation, when no CPE of a particular line is active during the assigned transmission opportunity. Discontinuous operation also refers to the case when some lines of a binder discontinue transmission while others continue transmission.

Handling of multiple channel matrices may be complex. In one example, in order to reduce the complexity, the reported channel estimations may be combined and an averaged matrix may be generated. In another example, crosstalk channels may be estimated between selected CPEs (e.g., those of the major customer applications), allowing other CPEs to operate with higher residual crosstalk. In this case, crosstalk between selected CPEs is estimated and cancelled while crosstalk between other CPEs may be avoided for example by using different transmit times (i.e. TDMA) or different frequencies (i.e. FDMA), or both.

Each CPE may have an opportunity to send a probe sequence (e.g. an orthogonal or pseudo-orthogonal sequence) at a pre-defined time and frequency. The network device 200 may receive the probe sequences from any combination of the CPEs at different customer locations (e.g., all four combinations in FIG. 30). To provide these opportunities, the number of timeslots intended for transmission of upstream probe sequences may be sufficient to accommodate all the potentially connected CPEs in the transmission period assigned for every element of the probe sequence. If N CPEs are connected to line 1, there may be at least N predefined probe sequence timeslots during each transmission period of a particular probe sequence element.

The network device 200 may control the sequence in which CPEs of each particular line are sending the probe sequence elements, so that all relevant combinations of CPEs can be analyzed. The network device 200 may communicate control information that determines the sequence in which CPEs are transmitting the probe sequence over the management channel during the initialization and in showtime (e.g., when some CPEs are joining or disconnected). In one example, the network device 200 may indicate the initial order, which may be further updated based on the predefined algorithm or an algorithm communicated by the network device 200. In another example, the network device 200 may indicate the current order (using handshake or a message during the initialization and using MAP during showtime).

In another example, the CPEs may perform pre-compensation of the upstream signal such that the network device 200 may use the same upstream FEXT canceler for different CPEs. The pre-compensation may be selected such that it compensates the difference between different CPE upstream channels of different CPEs connected to the same line.

Assume that an upstream transmission from one subscriber is described by:

$$\hat{u} = GHPu + Gn,$$

where $\hat{u}$ is the receive signal vector, G is the equalizer matrix at the network device (DPU/FE) side, a dense matrix H is the crosstalk channel matrix, a dense matrix P is the CPE-side precoder matrix, a diagonal matrix u is the transmit signal vector, and n is the noise vector.

In case of upstream transmission in a point-to-multipoint system, different channel matrices appear when different CPEs are transmitting, e.g., when CPE 1 transmits, the channel matrix is composed of a common channel (the cable binder) $H_{binder}$ and the in-home channel for CPE 1 $H_{cpe1}$ and the in-home channel for CPE 2 $H_{cpe2}$ (and so on for all other CPEs).

Assuming CPE 1 and CPE 2 are connected to the same line of the binder, when CPE 1 is transmitting upstream, $$\hat{u} = GH_{binder}H_{cpe1}P_1u + Gn, \text{ and}$$

when CPE 2 is transmitting upstream, $\hat{u} = G H_{binder}H_{cpe2}P_2u + G$ n.

To be able to use the same crosstalk canceler G at the network device (DPU/FE) side for both cases, $H_{cpe1}P_1 = H_{cpe2}P_2 \neq 0$ is required. $P_1$ and $P_2$ are the pre-compensation matrices, which are all-zeros except the diagonal elements corresponding to line where the network device (DPU/FE) is currently receiving.

For a complete channel estimation (e.g. between all network device transmitters and all CPE receivers and between all network device receivers and all CPE transmitters), different orthogonal sequences may be assigned to all transmitters that may transmit at the same time/frequency (for the full duplex case). Different orthogonal sequences may be assigned to upstream and downstream transmissions on the same line to be able to distinguish between them.

With error feedback from all receivers, which may be enabled at the same time, the complete channel matrix (from every transmitter to every receiver) may be built up. The channel matrices may have the following dimensions for M ports at the network device side and N ports in total at all the CPE sides: N×M downstream and M×N upstream in TDD case, and (N+M)×(N+M) in FDX case. In case of multiple frequency bands, the channel matrices of the same size exist for each frequency band. For different sets of active transmitters and receivers, different channel estimations may be performed and different crosstalk cancellers may be used.

In the examples of FIGS. 29 and 30, multiple CPEs may be connected to one line and thus, these CPEs may not transmit simultaneously. To measure a channel matrix which reflects the actual channel characteristics in the examples of FIGS. 29 and 30 where different transmitters are active at different times, the channel estimation may be performed for the same selection of enabled and disabled lines.

A 3-state channel estimation sequence comprising +1, −1 and 0 ('0' for lines which do not transmit) may be used and the sequence may be constructed such that from a group of CPEs which cannot transmit/receive simultaneously, one CPE may be assigned a non-zero probe sequence element at a time. The CPEs where the 0-state is assigned are expected to behave the same as when they are in a quiet mode because another CPE is transmitting data. In an example of FIG. 30, where 4 CPEs on two lines are in a TDD mode, transmit opportunities may be assigned as follows:

|       | T1     | T2     | T3     | T4     |
|-------|--------|--------|--------|--------|
| Line1 | CPE1.1 | CPE1.1 | CPE1.2 | CPE1.2 |
| Line2 | CPE2.1 | CPE2.2 | CPE2.1 | CPE2.2 |

In downstream in this example (FIG. 30) where M=2, N=2, and CPE 1.1 and 1.2 cannot transmit simultaneously as well as CPE 2.1 and 2.2, a 2×2 orthogonal sequence may be as follows:

| 1 | 1  |
|---|----|
| 1 | -1 |

The above table is an example of Walsh-Hadamard sequences. A sequence of length 2 may be used for 2×2 channel estimation.

Channel estimation performed for each configuration may be as follows:

|       | T1 | T1 | T2 | T2 | T3 | T3 | T4 | T4 |
|-------|----|----|----|----|----|----|----|----|
| Line1 | 1  | 1  | 1  | 1  | 1  | 1  | 1  | 1  |
| Line2 | 1  | -1 | 1  | -1 | 1  | -1 | 1  | -1 |

This is an example how to assign the channel estimation sequence (e.g., in downstream direction) for a topology according to FIG. 30 to obtain a complete channel estimation for all combinations. During T1, CPEs 1.1 and 2.1 receive the channel estimation signal and report the feedback signal, during T2, CPE 1.1 and 2.2 report the feedback and so on.

In upstream in this example (FIG. 30), a 4×4 orthogonal sequence may be as follows:

| 1 | 1  | 0 | 0  |
|---|----|---|----|
| 1 | -1 | 0 | 0  |
| 0 | 0  | 1 | 1  |
| 0 | 0  | 1 | -1 |

In upstream, there are four transmitters and thus 4 sequences of length 4 may be used. As there are two lines in this example, the same Walsh-Hadamard sequence may be used and it is extended with zeros to assign quiet symbols to those CPEs which cannot transmit simultaneously as they are connected to the same line.

Channel estimation performed for each configuration may be as follows:

|        | T1 | T1 | T2 | T2 | T3 | T3 | T4 | T4 |
|--------|----|----|----|----|----|----|----|----|
| CPE1.1 | 1  | 1  | 1  | 1  | 0  | 0  | 0  | 0  |
| CPE1.2 | 0  | 0  | 0  | 0  | 1  | 1  | 1  | 1  |
| CPE2.1 | 1  | -1 | 0  | 0  | 1  | -1 | 0  | 0  |
| CPE2.2 | 0  | 0  | 1  | -1 | 0  | 0  | 1  | -1 |

The above table is an example how the 4×4 sequences are assigned to the CPEs for upstream channel estimation in the topology shown in FIG. 30.

In case of full duplex transmission in the network topology shown in FIG. 30, there may be four active transmitters at any time. Thus, a Walsh-Hadamard sequence of length 4 (or longer) may be used. Zeros may be assigned for those CPEs which cannot transmit at the same time as they are connected to the same line. An example of full duplex transmissions (4 simultaneously active transmitters) is shown in a table below.

|        | T1 | T1 | T1 | T1 | T2 | T2 | T2 | T2 | T3 | T3 | T3 | T3 | T4 | T4 | T4 | T4 |
|--------|----|----|----|----|----|----|----|----|----|----|----|----|----|----|----|----|
| Line1  | 1  | 1  | 1  | 1  | 1  | 1  | 1  | 1  | 1  | 1  | 1  | 1  | 1  | 1  | 1  | 1  |
| Line2  | 1  | -1 | 1  | -1 | 1  | -1 | 1  | -1 | 1  | -1 | 1  | -1 | 1  | -1 | 1  | -1 |
| CPE1.1 | 1  | 1  | -1 | -1 | 1  | 1  | -1 | -1 | 0  | 0  | 0  | 0  | 0  | 0  | 0  | 0  |
| CPE1.2 | 0  | 0  | 0  | 0  | 1  | 1  | -1 | -1 | 1  | -1 | -1 | 1  | 1  | -1 | -1 | 1  |
| CPE2.1 | 1  | -1 | -1 | 1  | 0  | 0  | 0  | 0  | 1  | -1 | -1 | 1  | 0  | 0  | 0  | 0  |
| CPE2.2 | 0  | 0  | 0  | 0  | 1  | -1 | -1 | 1  | 0  | 0  | 0  | 0  | 1  | -1 | -1 | 1  |

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is a device for transmitting and receiving on a copper wire. The device comprises a plurality of transceivers for transmitting signals to, and receiving signals from, at least one customer premise equipment (CPE) via a plurality of channels. The plurality of channels are formed by using a plurality of twisted pairs of a twisted pair cable or by using a plurality of frequency bands on a coaxial cable or on a twisted pair. The device comprises at least one canceller for cancelling at least one of echo or crosstalk on at least one channel, and a processor configured to allocate to a single CPE multiple frequency bands on a single coaxial cable or on a twisted pair, or multiple twisted pairs of a twisted pair cable.

Example 2 is the device of example 1, wherein the processor is configured to reallocate a frequency band or a twisted pair from one connected CPE to another connected CPE.

Example 3 is the device of example 1, wherein the processor is configured to transmit to or receive from a first CPE via a first channel on a first twisted pair of a twisted pair cable in a TDD mode and transmit to or receive from a second CPE via a second channel on a second twisted pair of the twisted pair cable in a FDX mode.

Example 4 is the device of example 3, wherein a crosstalk exists between the first twisted pair and the second twisted pair in the twisted pair cable.

Example 5 is the device of example 4, wherein a frequency band of the first channel overlaps with a frequency band of the second channel, and the processor is configured to use same multi-carrier symbol duration and tone spacing on the first channel and the second channel.

Example 6 is the device of example 5, wherein the processor is configured to transmit to or receive from the second CPE via a third channel on the second twisted pair of the twisted pair cable in an FDX mode, wherein the third channel is on a higher frequency band than the second channel and the first channel, and the processor is configured to use different multi-carrier symbol duration and tone spacing on the third channel.

Example 7 is the device as in any one of examples 3-6, wherein the processor is configured to stop an upstream transmission on the second twisted pair of the twisted pair cable if there is a downstream transmission on the first twisted pair of the twisted pair cable.

Example 8 is the device as in any one of examples 3-6, wherein the processor is configured to reduce a transmit power of an upstream transmission on the second twisted pair of the twisted pair cable if there is a downstream transmission on the first twisted pair of the twisted pair cable.

Example 9 is the device as in any one of examples 1-8, wherein user data is transmitted by DTUs and the processor is configured to use different sizes of DTUs or different retransmission rules of DTUs for different channels.

Example 10 is the device as in any one of examples 1-9, wherein the processor is configured to transmit a same signal to the single CPE over multiple twisted pairs in the twisted pair cable.

Example 11 is the device as in any one of examples 1-10, wherein the processor is configured to transmit different signals to the single CPE over multiple twisted pairs in a twisted pair cable.

Example 12 is the device as in any one of examples 1-11, wherein a plurality of CPEs are connected to a shared channel.

Example 13 is the device of example 12, wherein the processor is configured to transmit to the CPEs in a TDMA scheme.

Example 14 is the device as in any one of examples 12-13, wherein the processor is configured to apply a same bit allocation and gain setting to a group of CPEs connected to the shared channel.

Example 15 is the device as in any one of examples 12-14, wherein the processor is configured to use a different bit allocation and gain setting for different time slots.

Example 16 is the device as in any one of examples 12-14, wherein the processor is configured to use a different upstream crosstalk matrix for a different combination of transmitting CPEs.

Example 17 is the device as in any one of examples 12-16, wherein the processor is configured to select a subset of CPEs connected to the shared channel for channel estimation and implement crosstalk cancellation for the subset of CPEs.

Example 18 is the device as in any one of examples 12-17, wherein the processor is configured to use a same FEXT cancellation for upstream transmissions from different CPEs on the shared channel if the upstream transmissions are pre-compensated by the CPEs.

Example 19 is the device as in any one of examples 12-18, wherein the processor is configured to indicate to each CPE connected to the shared channel in which order each CPE sends its probe sequence for channel estimation on the shared channel.

Example 20 is the device as in any one of examples 12-19, wherein the processor is configured to transmit orthogonal or pseudo-orthogonal sequences to different CPEs on the shared channel.

Example 21 is the device as in any one of examples 12-20, wherein the processor is configured to send a frame to the CPEs connected to the shared channel including information regarding a pattern of transmission opportunities for the CPEs, where a different CPE is allocated to a certain time fraction of a transmission frame.

Example 22 is the device of example 21, wherein the time fraction for each CPE is dynamically adjusted in response to requests from the CPEs or as a default setting from a service provider.

Example 23 is the device as in any one of examples 1-22, wherein the device is configured to select a CPE among a set of CPEs for routing traffic to a mobile device connected to the set of CPEs.

Example 24 is a CPE for transmitting and receiving on a copper wire installed at a customer premise. The CPE comprises at least one transceiver for transmitting signals to, and receiving signals from, a network device via at least one channel assigned by the network device among a plurality of channels. The plurality of channels are formed by using a plurality of twisted pairs of a twisted pair cable or by using a plurality of frequency bands on a coaxial cable or on a twisted pair. The CPE further comprises an equalizer for receiving a direct channel and a crosstalk channel on a first twisted pair of the twisted pair cable simultaneously from the network device. The crosstalk channel is coupled to the first twisted pair of the twisted pair cable from a second twisted pair of the twisted pair cable that is temporarily disconnected from another CPE.

Example 25 is the CPE of example 24, wherein the transceiver is configured to pre-compensate an upstream transmission to the network device.

Example 26 is the CPE as in any one of examples 24-25, wherein the transceiver is configured to transmit on a shared channel, shared by a plurality CPEs in a TDMA scheme.

Example 27 is the CPE of example 26, wherein the transceiver is configured to transmit a probe sequence on the shared channel based on a schedule from the network device.

Example 28 is a device for transmitting and receiving on a copper wire installed at a customer premise. The device comprises means for transmitting signals to, and receiving signals from, at least one CPE via a plurality of channels. The plurality of channels are formed by using a plurality of twisted pairs of a twisted pair cable or by using a plurality of frequency bands on a coaxial cable or on a twisted pair. The device further comprises means for cancelling at least one of echo or crosstalk on at least one channel, and means for allocating to a single CPE multiple frequency bands on a single coaxial cable or on a twisted pair, or multiple twisted pairs.

Example 29 is the device of example 28, further comprising means for reallocating a frequency band or a twisted pair from one connected CPE to another connected CPE.

Example 30 is the device as in any one of examples 28-29, further comprising means for transmitting to or receiving from a first CPE via a first channel on a first twisted pair of a twisted pair cable in a TDD mode and transmitting to or receiving from a second CPE via a second channel on a second twisted pair of the twisted pair cable in a FDX mode, wherein a crosstalk exists between the first twisted pair and the second twisted pair in the twisted pair cable.

Example 31 is the device of example 30, further comprising means for stopping an upstream transmission on the second twisted pair in the twisted pair cable if there is a downstream transmission on the first twisted pair in the twisted pair cable.

Example 32 is the device as in any one of examples 30-31, further comprising means for reducing a transmit power of an upstream transmission on the second twisted pair in the twisted pair cable if there is a downstream transmission on the first twisted pair in the twisted pair cable.

Example 33 is the device as in any one of examples 28-32, wherein a plurality of CPEs are connected to a shared channel.

Example 34 is the device of example 33, further comprising means for transmitting to the CPEs in a TDMA scheme.

Example 35 is the device as in any one of example 33-34, further comprising means for using a different upstream crosstalk matrix for a different combination of transmitting CPEs.

Example 36 is the device as in any one of examples 33-35, further comprising means for selecting a subset of CPEs connected to the shared channel for channel estimation and implementing crosstalk cancellation for the subset of CPEs.

Example 37 is a method for transmitting and receiving on a copper wire installed at a customer premise. The method comprises assigning a first channel comprising multiple frequency bands on a single coaxial cable or on a twisted pair, or multiple twisted pairs in a twisted pair cable to a first CPE, transmitting a first signal to the first CPE on the first channel, receiving a second signal from the first CPE on the first channel, and cancelling at least one of echo or crosstalk on the first channel.

Example 38 is the method of example 37, further comprising reallocating to the first CPE a second channel that is allocated to a second CPE, wherein the second channel is another frequency band or another twisted pair in the twisted pair cable.

Example 39 is the method as in any one of examples 37-38, wherein the first signal is transmitted to the first CPE via the first channel on a first twisted pair in the twisted pair cable in a TDD mode, and further comprises transmitting to a second CPE via a second channel on a second twisted pair in the twisted pair cable in a FDX mode.

Example 40 is the method of example 39, wherein a crosstalk exists between the first twisted pair and the second twisted pair in the twisted pair cable.

Example 41 is the method as in any one of examples 39-40, wherein a frequency band of the first channel overlaps with a frequency band of the second channel, and same multi-carrier symbol duration and tone spacing are used on the first channel and the second channel.

Example 42 is the method of example 41, further comprising transmitting to the second CPE via a third channel on the second twisted pair of the twisted pair cable in an FDX mode, wherein the third channel is on a higher frequency band than the first channel and the second channel, and different multi-carrier symbol duration and tone spacing are used on the third channel.

Example 43 is the method as in any one of examples 40-42, further comprising sending a control signal to the second CPE to stop an upstream transmission on the second twisted pair of the twisted pair cable if there is a downstream transmission on the first twisted pair of the twisted pair cable.

Example 44 is the method as in any one of examples 40-42, further comprising sending a control signal to the second CPE to reduce a transmit power of an upstream transmission on the second twisted pair of the twisted pair cable if there is a downstream transmission on the first twisted pair of the twisted pair cable.

Example 45 is the method as in any one of example 37-44, wherein user data is transmitted via DTUs and different sizes of DTUs or different retransmission rules of DTUs are used for different channels.

Example 46 is the method as in any one of examples 37-45, wherein a plurality of CPEs are connected to a shared channel.

Example 47 is the method of example 46, wherein signals are transmitted to the CPEs in a TDMA scheme.

Example 48 is the method as in any one of examples 46-47, wherein a same bit allocation and gain setting is applied to a group of CPEs connected to the shared channel.

Example 49 is the method as in any one of examples 46-47, wherein a different bit allocation and gain setting is used for different time slots.

Example 50 is the method as in any one of examples 46-49, wherein a different upstream crosstalk matrix is used for a different combination of transmitting CPEs.

Example 51 is the method as in any one of examples 46-50, further comprising selecting a subset of CPEs connected to the shared channel, performing channel estimation with respect to the subset of CPEs, and implementing crosstalk cancellation for the subset of CPEs.

Example 52 is the method as in any one of examples 46-51, wherein a same FEXT cancellation is used for upstream transmissions from different CPEs on the shared channel if the upstream transmissions are pre-compensated by the CPEs.

Example 53 is the method as in any one of examples 46-52, further comprising indicating to each CPE connected to the shared channel in which order each CPE sends its probe sequence for channel estimation on the shared channel.

Example 54 is the method as in any one of examples 46-53, further comprising sending a frame to the CPEs connected to the shared channel including a pattern of transmission opportunities for the CPEs, where a different CPE is allocated to a certain time fraction of a transmission frame.

Example 55 is the method as in any one of examples 37-54, further comprising selecting a CPE among a set of CPEs for routing traffic to a mobile device connected to the set of CPEs.

Example 56 is a machine-readable storage medium comprising code, when executed, to cause a machine to perform a method for transmitting and receiving on a copper wire installed at a customer premise, wherein the method comprises assigning a first channel comprising multiple frequency bands on a single coaxial cable or on a twisted pair, or multiple twisted pairs in a twisted pair cable to a first CPE, transmitting a first signal to the first CPE on the first channel, receiving a second signal from the first CPE on the first channel, and cancelling at least one of echo or crosstalk on the first channel.

Example 57 is the machine-readable storage medium of example 56, wherein the method further comprises reallocating to the first CPE a second channel that is allocated to a second CPE, wherein the second channel is another frequency band or another twisted pair in the twisted pair cable.

Example 58 is the machine-readable storage medium of example 57, wherein the first signal is transmitted to the first CPE via the first channel on a first twisted pair of the twisted pair cable in a time division duplex mode, and the method further comprises transmitting to a second CPE via a second channel on a second twisted pair of the twisted pair cable in a full duplex mode, wherein a crosstalk exists between the first twisted pair and the second twisted pair of the twisted pair cable.

Example 59 is a machine-readable storage medium comprising code, when executed, to cause a machine to perform a method in any one of examples 37-55.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A device for transmitting and receiving on a copper wire, the device comprising:
    a plurality of transceivers for transmitting signals to, and receiving signals from, at least one customer premise equipment (CPE) via a plurality of channels, wherein the plurality of channels are formed by using a plurality of twisted pairs of a twisted pair cable or by using a plurality of frequency bands on a coaxial cable or on a twisted pair;
    at least one canceller for cancelling at least one of echo or crosstalk on at least one channel; and
    a processor configured to allocate to a single CPE three or more frequency bands on a single coaxial cable or on a twisted pair, or multiple twisted pairs of a twisted pair cable.

2. The device of claim 1, wherein the processor is configured to allocate a frequency band or a twisted pair from one connected CPE to another connected CPE.

3. The device of claim 1, wherein the processor is configured to transmit to or receive from a first CPE via a first channel on a first twisted pair of a twisted pair cable in a time division duplex (TDD) mode and transmit to or receive from a second CPE via a second channel on a second twisted pair of the twisted pair cable in a full duplex (FDX) mode.

4. The device of claim 3, wherein a crosstalk exists between the first twisted pair and the second twisted pair in the twisted pair cable.

5. The device of claim 3, wherein a frequency band of the first channel overlaps with a frequency band of the second channel, and the processor is configured to use same multi-carrier symbol duration and tone spacing on the first channel and the second channel.

6. The device of claim 5, wherein the processor is configured to transmit to or receive from the second CPE via a third channel on the second twisted pair of the twisted pair cable in an FDX mode, wherein the third channel is on a higher frequency band than the second channel and the first channel, and the processor is configured to use different multi-carrier symbol duration and tone spacing on the third channel.

7. The device of claim 3, wherein the processor is configured to stop an upstream transmission on the second twisted pair of the twisted pair cable if there is a downstream transmission on the first twisted pair of the twisted pair cable.

8. The device of claim 3, wherein the processor is configured to reduce a transmit power of an upstream transmission on the second twisted pair of the twisted pair cable if there is a downstream transmission on the first twisted pair of the twisted pair cable.

9. The device of claim 1, wherein a plurality of CPEs are connected to a shared channel.

10. The device of claim 9, wherein the processor is configured to apply a same bit allocation and gain setting to a group of CPEs connected to the shared channel.

11. A customer premise equipment (CPE) for transmitting and receiving on a copper wire installed at a customer premise, the CPE comprising:
at least one transceiver for transmitting signals to, and receiving signals from, a network device via at least one channel assigned by the network device among a plurality of channels, wherein the plurality of channels are formed by using a plurality of twisted pairs of a twisted pair cable or by using a plurality of allocated frequency bands on a coaxial cable or on a twisted pair; and
an equalizer for receiving a direct channel and a crosstalk channel on a first twisted pair of the twisted pair cable simultaneously from the network device, wherein the crosstalk channel is coupled to the first twisted pair of the twisted pair cable from a second twisted pair of the twisted pair cable that is temporarily disconnected from another CPE.

12. The CPE of claim 11, wherein the transceiver is configured to pre-compensate an upstream transmission to the network device.

13. A method for transmitting and receiving on a copper wire installed at a customer premise, the method comprising:
assigning a first channel comprising multiple allocated frequency bands on a single coaxial cable or on a twisted pair, or multiple twisted pairs in a twisted pair cable to a first customer premise equipment (CPE);
transmitting a first signal to the first CPE on the first channel;
receiving a second signal from the first CPE on the first channel; and
cancelling at least one of echo or crosstalk on the first channel, wherein a frequency band of the first channel at least partially overlaps with a frequency band of the second channel.

14. The method of claim 13, further comprising:
allocating to the first CPE a second channel that is allocated to a second CPE, wherein the second channel is another frequency band or another twisted pair in the twisted pair cable.

15. The method of claim 13, wherein the first signal is transmitted to the first CPE via the first channel on a first twisted pair in the twisted pair cable in a time division duplex (TDD) mode, and further comprising:
transmitting to a second CPE via a second channel on a second twisted pair in the twisted pair cable in a full duplex (FDX) mode.

16. The method of claim 15, wherein a crosstalk exists between the first twisted pair and the second twisted pair in the twisted pair cable.

17. The method of claim 16, wherein same multi-carrier symbol duration and tone spacing are used on the first channel and the second channel.

18. The method of claim 17, further comprising:
transmitting to the second CPE via a third channel on the second twisted pair of the twisted pair cable in an FDX mode, wherein the third channel is on a higher frequency band than the first channel and the second channel, and different multi-carrier symbol duration and tone spacing are used on the third channel.

19. The method of claim 16, further comprising:
sending a control signal to the second CPE to stop an upstream transmission on the second twisted pair of the twisted pair cable if there is a downstream transmission on the first twisted pair of the twisted pair cable.

20. The method of claim 16, further comprising:
sending a control signal to the second CPE to reduce a transmit power of an upstream transmission on the second twisted pair of the twisted pair cable if there is a downstream transmission on the first twisted pair of the twisted pair cable.

21. The method of claim 14, wherein a plurality of CPEs are connected to a shared channel.

22. The method of claim 21, wherein a same bit allocation and gain setting is applied to a group of CPEs connected to the shared channel.

* * * * *